(12) United States Patent
Takaishi

(10) Patent No.: US 7,460,331 B2
(45) Date of Patent: Dec. 2, 2008

(54) SEEK CONTROL METHOD, SEEK CONTROL DEVICE AND MEDIUM STORAGE DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 65 days.

(21) Appl. No.: 11/789,789

(22) Filed: Apr. 25, 2007

(65) Prior Publication Data

US 2008/0080087 A1 Apr. 3, 2008

(30) Foreign Application Priority Data

Sep. 28, 2006 (JP) .............................. 2006-264679

(51) Int. Cl.
G11B 5/596 (2006.01)
(52) U.S. Cl. ............... 360/78.04; 360/78.06; 360/78.09
(58) Field of Classification Search .................. None
See application file for complete search history.

(56) References Cited

U.S. PATENT DOCUMENTS 6,738,218 B1 5/2004 Hamada et al.
6,831,809 B2 12/2004 Kagami et al.
2002/0159187 A1* 10/2002 Kagami et al. ........... 360/78.09
2006/0007592 A1 1/2006 Takaishi

FOREIGN PATENT DOCUMENTS

| EP | 0 537 990 | 4/1993 |
|---|---|---|
| EP | 1 376 556 | 1/2004 |
| JP | 03-233609 | 10/1991 |
| JP | 05-143165 | 6/1993 |
| JP | 10-124111 | 5/1998 |
| JP | 2002-258902 | 9/2002 |
| WO | WO 99/44194 | 9/1999 |

* cited by examiner

*Primary Examiner*—Andrew L. Sniezek
(74) *Attorney, Agent, or Firm*—Greer, Burns & Crain, Ltd

(57) ABSTRACT

In a seek control device based on a current observer control which performs two degree of freedom control, a current step difference to be generated when seek control is switched to following control is prevented. When seek control is switched to following control, a current step difference cancellation trajectory generation section calculates a current value Udiff for the amount of the step difference based on a difference between current values u(n) and u(n−1), and supplies a target position trajectory r'(n) (or target current trajectory) for offsetting this calculated value to a following controller. Therefore the current step difference of the output current is cancelled.

20 Claims, 15 Drawing Sheets

Servo Mark
Gray Code
Index
PosA PosB PosC PosD

SEEK CONTROL METHOD, SEEK CONTROL DEVICE AND MEDIUM STORAGE DEVICE

CROSS-REFERENCE TO RELATED APPLICATIONS

This application is based upon and claims the benefit of priority from the prior Japanese Patent Application No. 2006-264679, filed on Sep. 28, 2006, the entire contents of which are incorporated herein by reference.

BACKGROUND OF THE INVENTION

1. Field of the Invention

The present invention relates to a seek control method, seek control device and medium storage device for performing seek control, then switching to following control, and more particularly to a seek control method, seek control device and medium storage device for preventing the step difference of current which occurs at switching from seek control to following control.

2. Description of the Related Art

A device for controlling the position of an object to a target position is widely used. For example, this device is used for seek control (and following control performed thereafter) for moving a head to a target track, which is one of the positioning controls of a medium storage device, such as a magnetic disk device and an optical disk device.

In the seek control, coarse control is performed, which is switched to fine control near a target position, so that both high-speed moving to the target position and high precision positioning are implemented. For this, different control characteristics are provided for the coarse control (seek control) and fine control (following control).

FIG. 21 is a block diagram depicting a position control system of a prior art. A controller 100 controls a plant (object) 110. The controller 100 has a position error computing section 112 for computing a position error e between an actual position of the plant 110 and a target position Lseek, a target trajectory generation section 102 for generating a target trajectory r(n) based on the target position (or moving distance) Lseek, two controllers 103 and 104, a settling judgment section 108, a position error switching section 109, and an output switching section 106.

According to this position control system, in seek control, the controller 103 for seeking calculates the output current based on the target trajectory r(n) from the target trajectory generation section 102 and the position error 'e' from the switching section 109, and drives the plant 110 via the switching section 106.

On the other hand, the settling judgment section 108 judges whether the position error 'e' satisfies a predetermined settling judgment condition (e.g. zero), and if judged that the settling judgment condition is satisfied, the settling judgment section 108 judges that the object reached near the target position, and switches the two switching sections 106 and 109 to the controller 104 for following.

By this, following control starts, and the controller 104 for following calculates the output current value based on the position error 'e' from the switching section 109, and drives the plant 110 via the switching section 106 (e.g. see Japanese Patent Application Laid-Open No. H03-233609 and Japanese Patent Application Laid-Open No. H05-143165).

In this way, according to this configuration, the characteristics of the control system are different between the seek control and the following control. For example, during seek control, a configuration of a 400 Hz band filter is used, and during following control, a configuration of an 800 Hz band filter is used.

During seek control, the head passes many tracks at high-speed in the disk device, so noise included in the observation position is high compared with the following control period. If the seek control is performed with a same control band as the following control, the output current is easily influenced by the noise and designed characteristics cannot be implemented, so the control band is dropped during the seek control so as to prevent the influence of the noise.

FIG. 22 is a diagram depicting the problem of the prior art. As FIG. 22 shows, if a position error PES(e) becomes a predetermined threshold Th (e.g. ±0.5 track from the center of a target position in a magnetic disk device) or less, the settling judgment section switches the seek control to the following control.

In this case, even if current for controlling the same position error PES to zero is calculated at switching, the control bands of the seek control system and the following control system are different, so the output current changes at switching, where the step difference of output current is generated. This step difference of the output current is an instantaneous step change, so the operation of the actuator changes greatly in an instant, and a low audible sound is generated.

Since such devices as disk storage devices have become popular lately, storage devices are used in the home electronic field. For example, storage devices are used for portable music players, portable telephones, notebook type personal computers and video recording devices.

When a storage device is used for this equipment, low noise design is required, that is it is demanded that the sound is as low as possible. Therefore the audible sound generated by the current step difference, previously not a problem, now must be prevented.

Further the generation of the current step difference causes the generation of residual vibration since the following control system performs control to cancel this step difference. In other words, the time until following stabilizes and positioning completes takes longer.

SUMMARY OF THE INVENTION

With the foregoing in view, it is an object of the present invention to provide a position control method, position control device and medium storage device for canceling the current step difference which is generated when the seek control is switched to the following control.

It is another object of the present invention to provide a seek control method, seek control device and medium storage device for preventing the generation of noise which is generated when the seek control is switched to the following control.

It is still another object of the present invention to provide a seek control method, seek control device and medium storage device for canceling the current step difference which is generated when the seek control is switched to the following control, so as to prevent the generation of noise.

It is still another object of the present invention to provide a seek control method, seek control device and medium storage device for canceling the current step difference which is generated when the seek control is switched to the following control, and preventing the generation of residual vibration.

It is still another object of the present invention to provide a seek control method, seek control device and medium storage device for canceling the current step difference which is generated when the seek control is switched to the following control, without influencing the characteristics of the seek control system.

To achieve these objects, a seek control method of the present invention has, a step of computing a position error based on a target position of the object and a current position of the object, a step of executing seek control according to the position error, and a step of switching to following control when reaching near the target position is detected, and executing the following control. And the step of executing the following control further has a step of generating a target trajectory according to a difference between a control current of the seek control before the switching and a control current of the following control after the switching, and a step of executing the following control based on a two degree of freedom current observer control according to the target trajectory and the position error.

A medium storage device of the present invention has a head for at least reading data of a storage medium, an actuator for positioning the head to a predetermined position of the storage medium, and a control unit for executing seek control according to a position error based on a target position of the head and a current position acquired from the head, switching to following control when reaching near the target position is detected, and executing the following control, wherein the control unit generates a target trajectory according to a difference between a control current of the seek control before the switching and a control current of the following control after the switching, and executes the following control based on a two degree of freedom current observer control according to the target trajectory and the position error.

A seek control device of the present invention has: a block for computing a position error based on a target position of an object and a current position of the object; and a control unit for executing seek control according to the position error, switching to following control when reaching near the target position is detected, and executing the following control, wherein the control unit generates a target trajectory according to a difference between a control current of the seek control before the switching and a control current of the following control after the switching, and executes the following control based on a two degree of freedom current observer control according to the target trajectory and the position error.

In the present invention, it is preferable that the step of generating the target trajectory further has a step of computing the control current of the following control after the switching based on the two degree of freedom current observer control, and a step of generating a target trajectory according to the difference between the control current of the seek control before the switching and the computed control current of the following control.

Also in the present invention, it is preferable that the step of executing the seek control further has a step of computing the control current according to a position trajectory up to the target position based on the two degree of freedom current observer control.

Also in the present invention, it is preferable that the step of executing the following control based on the two degree of freedom current observer control further has a step of correcting an estimated position of a current sample of the current observer based on an estimated position error from the estimated position of the current sample, a step of computing a difference between the corrected estimated position and the target trajectory of the current sample, and computing an output value of the actuator based on the difference, and a step of computing an estimated position for computing a next output value based on the corrected estimated position and the output value of the current sample.

Also in the present invention, it is preferable that the step of computing an output value of the actuator further has a step of computing an estimated position advanced by a predetermined time from the sample point of time based on an output value in one sample before and the difference, and a step of computing an output value to the actuator based on the advanced estimated position, wherein the step of computing the next estimated position further has a step of computing an estimated position for computing a next output value based on the corrected estimated position, the output value of the current sample, and the output value in one sample before.

Also in the present invention, it is preferable that the step of generating the target trajectory further has a step of computing a difference between the control current of the seek control before the switching and the control current of the following control after the switching.

Also in the present invention, it is preferable that the step of generating the target trajectory further has a step of computing a difference between the control current of the seek control before the switching and the control current of the following control after the switching, and a step of generating the target position trajectory according to the difference.

When the seek control is switched to the following control, a current step difference calculation trajectory generation section calculates a current value Udiff for the amount of the step difference based on a difference between current values u(n) and u(n−1), and supplies a target position trajectory r'(n) (or target current trajectory) for offsetting this calculated value to the following control, so the current step difference is cancelled. In the following control, which is constructed by a two degree of freedom control system, a target position trajectory r'(n) is provided as a target position in the two degree of freedom position control system, therefore unnecessary disturbance is not input, and the control system is not affected.

Also by using the current step difference cancellation configuration, switching conditions can be more relaxed. Therefore switching to the following control at a more distant position from the target position and at faster velocity is possible than the prior art. As a consequence, seek time can be further decreased.

DESCRIPTION OF THE PREFERRED EMBODIMENTS

Embodiments of the present invention will now be described in the sequence of the medium storage device, first embodiment of the position control system, two degree of freedom control system, second embodiment, third embodiment, fourth embodiment, fifth embodiment, and other embodiments, but the present invention is not limited to these embodiments.

Medium Storage Device

Figure 1:
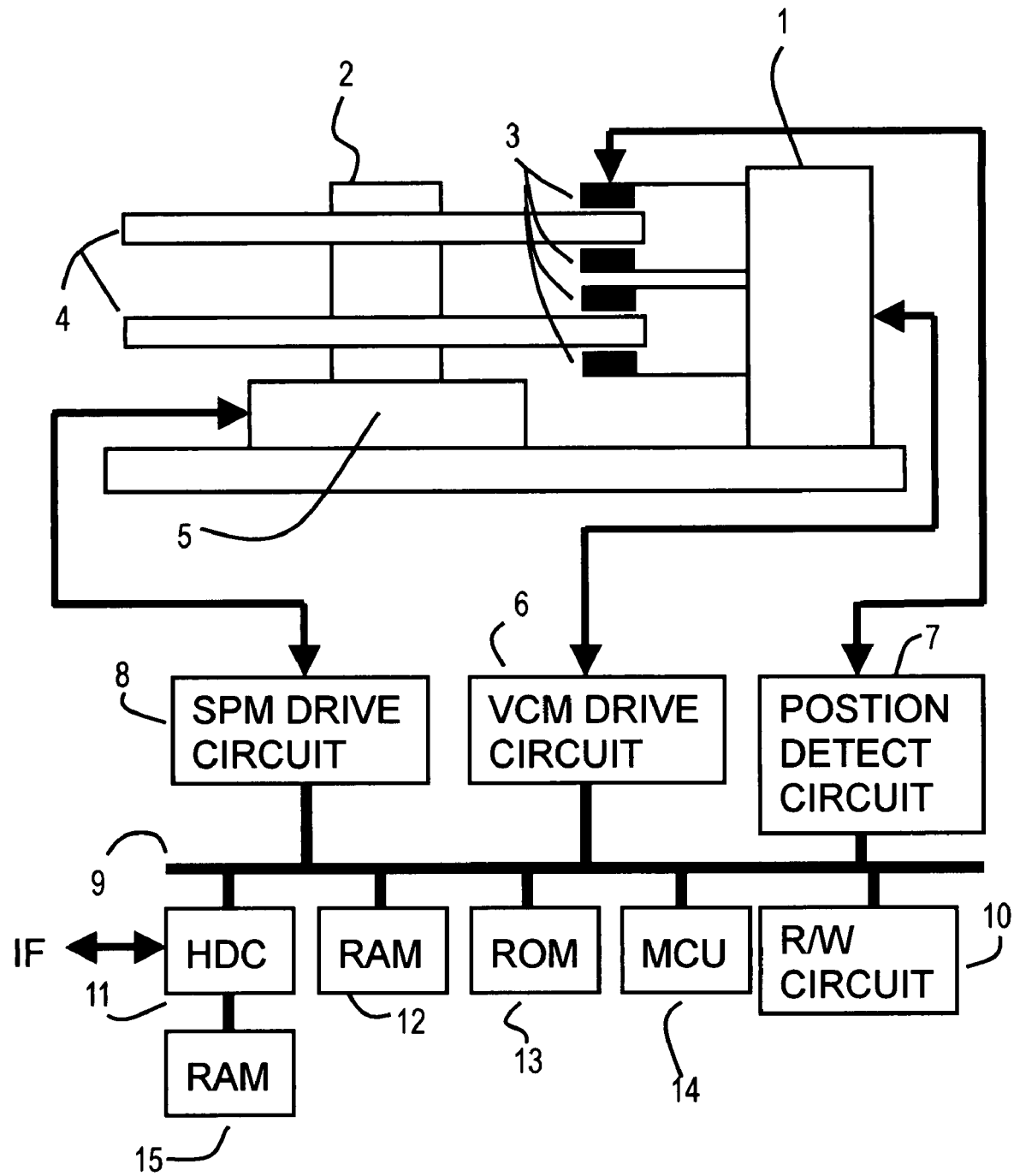
FIG. 1 is a block diagram depicting a medium storage device according to an embodiment of the present invention.
Figure 2:
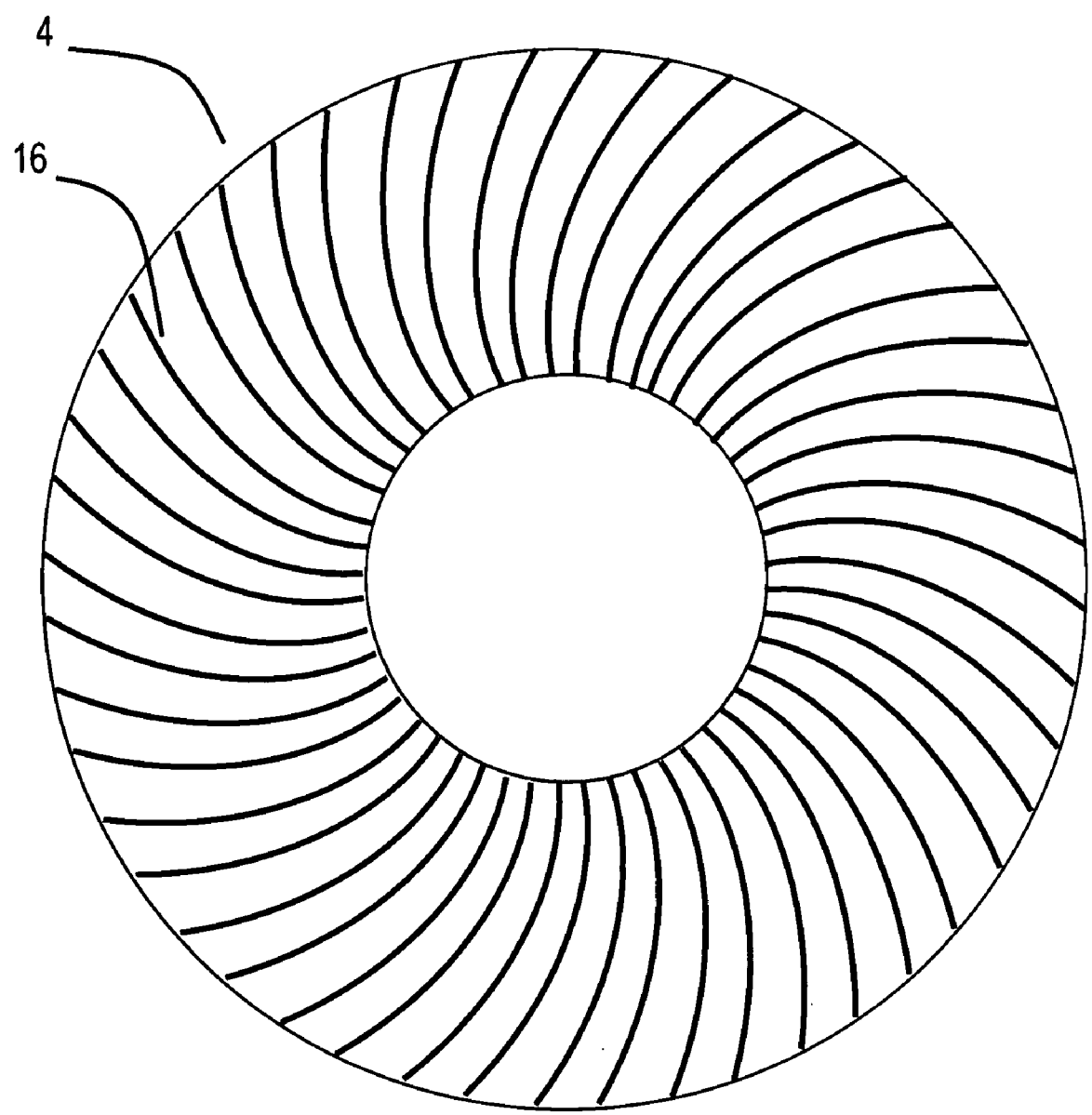
FIG. 2 is a diagram depicting the position signals of the disk in FIG. 1.
Figure 3:
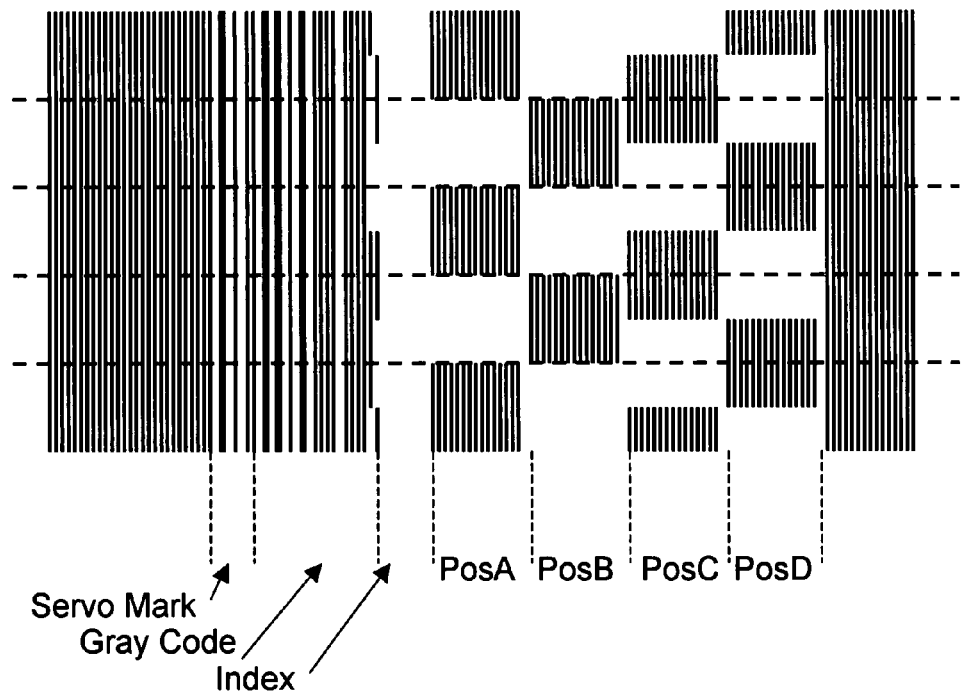
FIG. 3 is a diagram depicting details of the position signals in FIG. 2.
Figure 4:
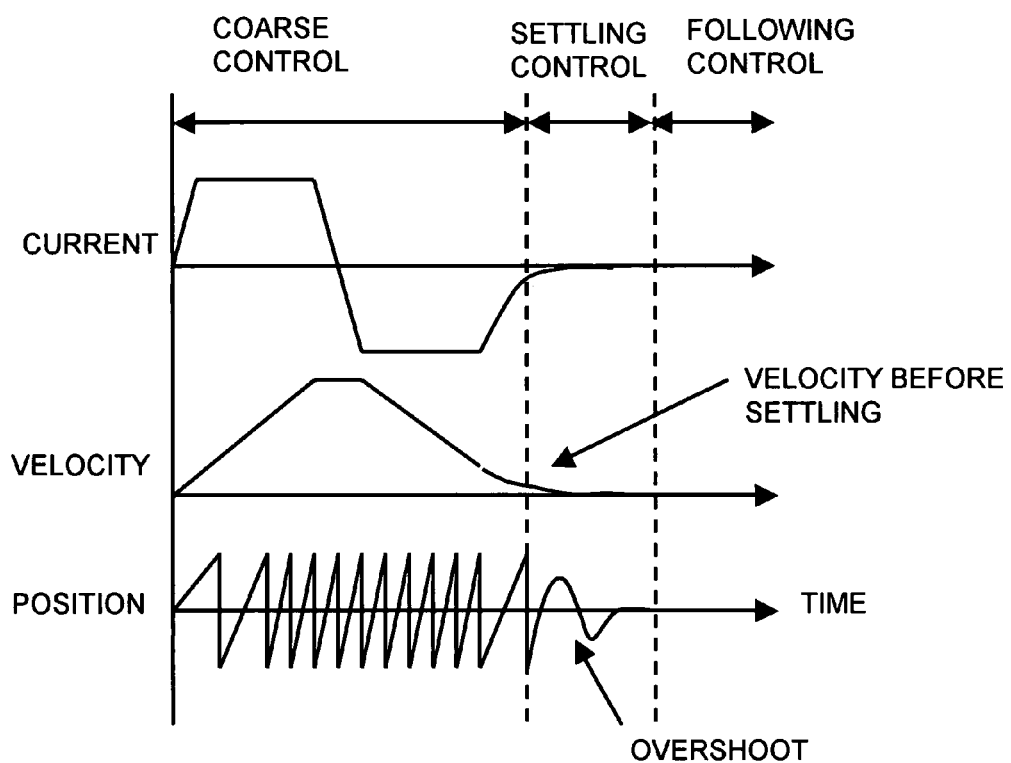
FIG. 4 is a diagram depicting the transition of the seek control according to an embodiment of the present invention.

FIG. 1 is a block diagram depicting a medium storage device according to an embodiment of the present invention, FIG. 2 is a diagram depicting the arrangement of position signals of a magnetic disk in FIG. 1, FIG. 3 is a diagram depicting the position signals of the magnetic disk in FIG. 1 and FIG. 2, and FIG. 4 is a diagram depicting the control transition of seek control.

FIG. 1 shows a magnetic disk device as a medium storage device. As FIG. 1 shows, a magnetic disk 4, which is a magnetic storage medium, is installed at a rotation axis 2 of a spindle motor 5. The spindle motor 5 rotates the magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1.

The magnetic head 3 has a read element and a write element. The magnetic head 3 is comprised of a read element, including a magneto-resistance (MR) element, stacked on a slider, and a write element, including a write coil, stacked thereon.

A position detection circuit 7 converts the position signals (analog signals) read by the magnetic head 3 into digital signals. A read/write (R/W) circuit 10 controls the reading and writing of the magnetic head 3. A spindle motor (SPM) drive circuit 8 drives the spindle motor 5. A voice coil motor (VCM) drive circuit 6 supplies drive current to the voice coil motor (VCM) 1, and drives the VCM 1.

A microcontroller (MCU) 14 detects (demodulates) the current position from the digital position signals from the position detection circuit 7, and computes a VCM drive command value according to an error between the detected current position and a target position. In other words, the microcontroller 14 performs position demodulation and servo control, including seek and following controls described in FIG. 5 and later. A read only memory (ROM) 13 stores a control program of the MCU 14. A random access memory (RAM) 12 stores data for processing of the MCU 14.

A hard disk controller (HDC) 11 judges a position in one track based on a sector number of a servo signal, and records/reproduces the data. A random access memory (RAM) 15 for buffer temporarily stores the read data or write data. The HDC 11 communicates with a host via an interface IF, such as USB (Universal Serial Bus), ATA or SCSI (Small Computer Interface). A bus 9 connects these composing elements.

As FIG. 2 shows, on the magnetic disk 4, servo signals (position signals) 16 are arrayed in each track in the circumferential direction from the outer circumference to the inner circumference with an equal interval. Each track has a plurality of sectors, and the solid lines in FIG. 2 indicate positions where the servo signals 16 are recorded. As FIG. 3 shows, the position signal is comprised of a servo mark ServoMark, track number GrayCode, index Index, and offset information (servo burst) PosA, PosB, PosC and PosD. The dotted line in FIG. 3 shows the track center.

The position signals in FIG. 3 are read by the head 3, and the position of the magnetic head in the radius direction is detected using the track number GrayCode and offset information PosA, PosB, PosC and PosD. Also the position of the magnetic head in the circumference direction is acquired based on the index signal Index.

For example, the sector number when the index signal is detected is set to No. 0, which is counted up every time the servo signal is detected, so as to acquire the sector number of each sector of the track. The sector number of the servo signal is used as a reference when data is recorded/reproduced. There is one index signal in one track. The sector number may be set instead of the index signal.

The MCU 14 in FIG. 1 confirms the position of the actuator 1 through the position detection circuit 7, performs servo computation, and supplies appropriate current to the VCM 1. In other words, as FIG. 4 shows, in seek control, the head is moved to the target position through the transition from coarse control, settling control and following control. For all of these controls, the current position of the head must be detected. Here the settling control will be described as a part of following control.

To confirm the position like this, the servo signals are recorded on the magnetic disk in advance, as mentioned in FIG. 2. In other words, as FIG. 3 shows, servo marks which indicate the start position of the servo signal, gray code which indicates the track number, index signal and signals PosA to PosD which indicate offset are recorded on the magnetic disk in advance. These signals are read by the magnetic head, and these servo signals are converted into digital values by the position detection circuit 7.

First Embodiment of Position Control System

Figure 5:
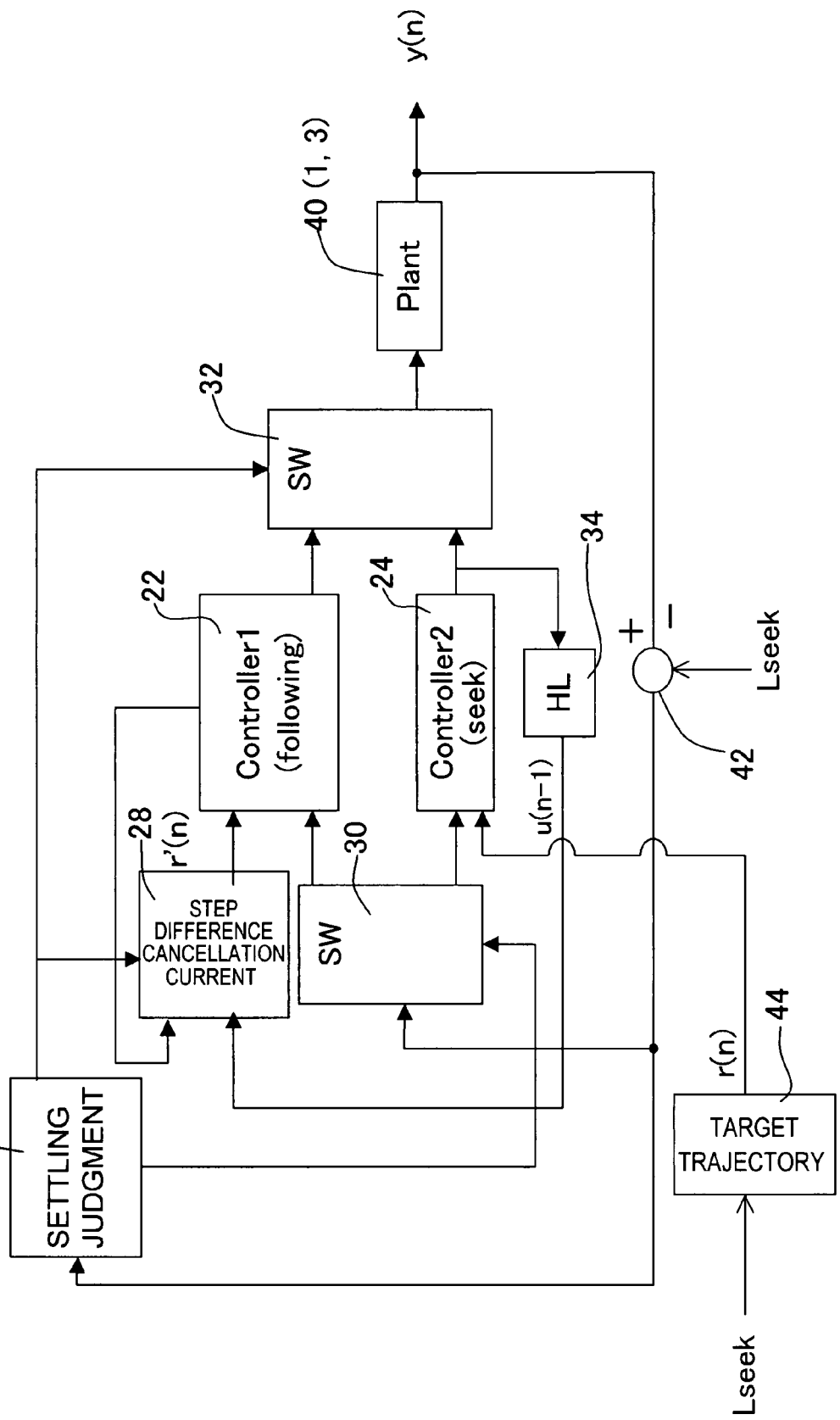
FIG. 5 is a block diagram depicting a position control system according to the first embodiment of the present invention.
Figure 6:
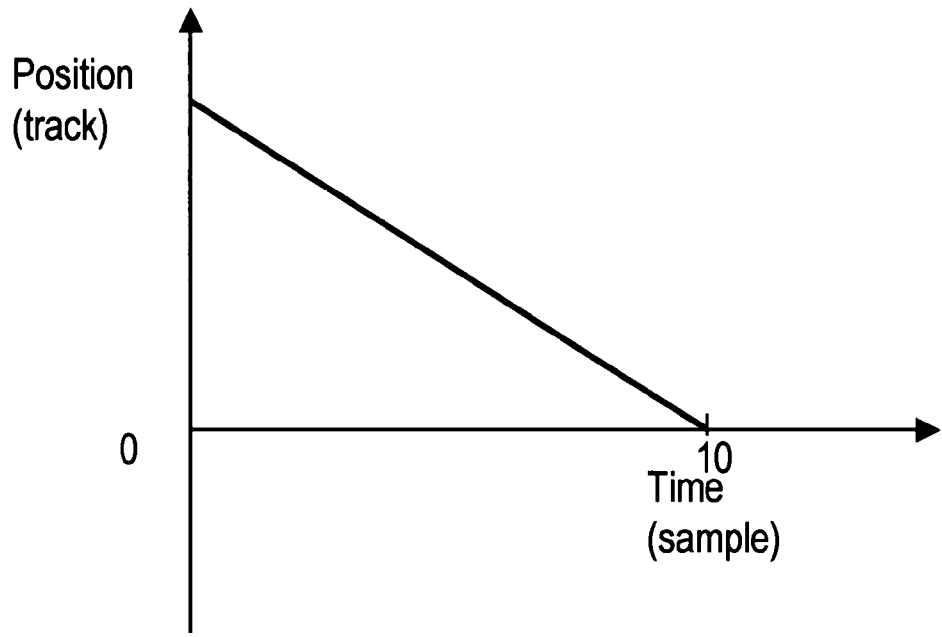
FIG. 6 is a diagram depicting the step difference cancellation trajectory in FIG. 5.
Figure 7:
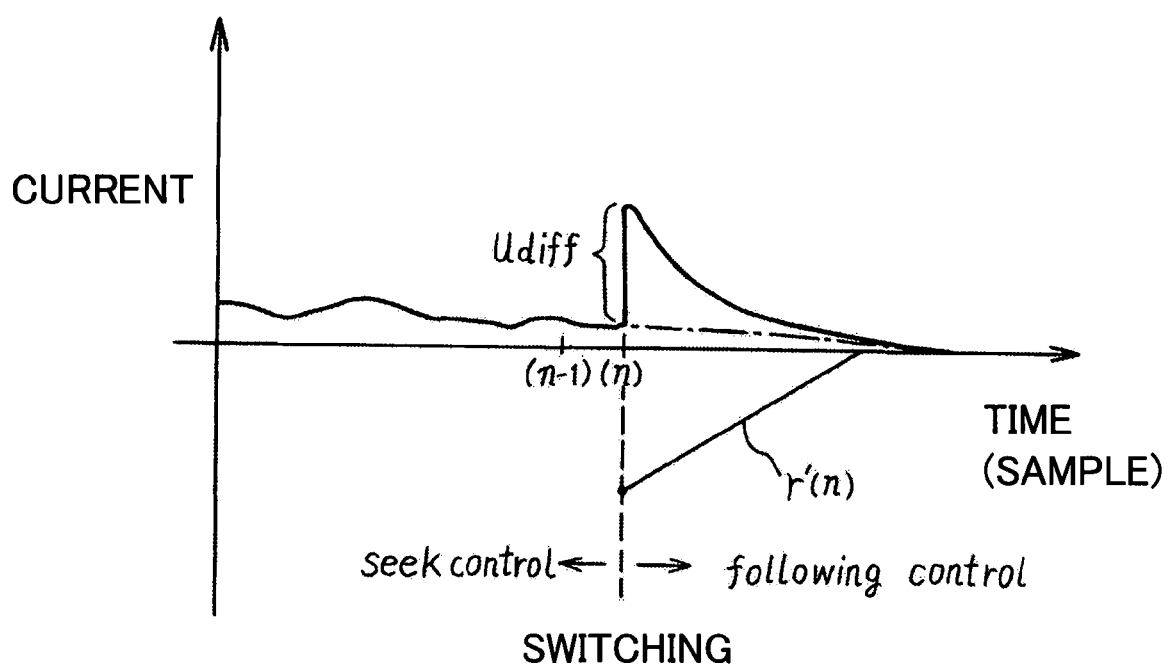
FIG. 7 is a diagram depicting the current step difference cancellation operation in FIG. 5.

FIG. 5 is a block diagram depicting a first embodiment of the position control system of the present invention, and is a block diagram of the position control system which the MCU 14 in FIG. 1 executes. FIG. 6 is a diagram depicting the step difference cancellation trajectory in FIG. 5, and FIG. 7 is a diagram depicting the current step difference cancellation operation in FIG. 5 and FIG. 6.

As FIG. 5 shows, a position control section 20 controls a plant (object) 40 (actuator 1 in the case of FIG. 1). The control section 20 has a position error computing section 42 for computing a position error 'e' between an actual position of the plant 40 and a target position Lseek, a target trajectory generation section 44 for generating a target trajectory r(n) based on the target position (or a moving distance) Lseek, two controllers 22 and 24, a settling judgment section 26, a position error switching section 30, and an output switching section 32.

The position control section 20 also has a hold block 34 for holding an output value of the controller 24 for seek control in each sample, and a current step difference cancellation trajectory generation section 28 for generating a current step difference cancellation trajectory r'(n) according to a difference between a current value from the hold block 34 and a current output value u(n) of the controller 22 for following.

As FIG. 5 shows, in the seek control, the seek controller 24 calculates an output current value based on the target trajectory r(n) from the target trajectory generation section 44 and a position error 'e' from the switching section 30, and drives the plant 40 (1, 3) via the switching section 32.

The settling judgment section 26 judges whether the position error 'e' satisfies a predetermined settling judgment condition (e.g. zero). If judged that the settling judgment condition is satisfied, the settling judgment section 26 judges that the object reached near the target position, and switches the two switching sections 30 and 32 to the following controller 22. By this, following control starts.

In the current sample after switching, the following controller 22 calculates the output current value based on the position error 'e' from the switching section 30. Also according to the switching instruction from the settling judgment section 26, the current step difference cancellation trajectory generation section 28 holds the current value u(n−1) which the seek controller 24 supplied to the actuator 1 just before switching, and acquires the output value (current value) u(n) calculated by the following controller 22.

And the current step difference cancellation trajectory generation section 28 calculates the current value Udiff for the amount of the step difference based on the difference between the current values u(n) and u(n−1), and supplies the target position trajectory r'(n) (or target current trajectory) for offsetting this calculated value to the following controller 22.

The following controller 22 is constructed by a two degree of freedom control system, where the calculated output value is used as a feedback control value, and the supplied target position trajectory r'(n) (or target current trajectory) is output to the plant 40 as a feed forward value.

This target position trajectory r'(n) (or target current trajectory) is a trajectory of which initial value is the calculated value Udiff, and which converges to "0" at a specified time later. FIG. 6 shows an example of the target position trajectory to be generated, where a triangular wave of which initial value is the calculated Udiff is used. In FIG. 6, the target position trajectory is shown by the straight line of which initial value is the calculated Udiff and which becomes "0" in 10 samples later.

As FIG. 7 shows, if the seek control system is switched to the following control system at the point of sample n, the current output to the actuator 1, which is calculated by the following control system in the sample n, has the step difference Udiff indicated by the solid line in FIG. 7.

Here the current step difference cancellation trajectory generation section 28 calculates the current value Udiff for the amount of the step difference based on the difference between the current values u(n) and u(n−1) at switching, and supplies the target position trajectory r'(n) for offsetting this calculated value to the following controller 22.

Therefore as the dashed line in FIG. 7 shows, the current step difference in the output current is cancelled. Here the following controller 22 is constructed by a two degree of freedom control system, and the target position trajectory r'(n) is provided as a target position of the two degree of freedom control system. Since the following controller 22 is designed as the two degree of freedom system and the target position trajectory is provided as the target position, the control system operates stably. Also response is predictable. In other words, unnecessary disturbance is not input, and the control system is not affected.

In the prior art, restrictions in position and velocity are tight in the conditions when the seek control is switched to the following control, since the above mentioned current step difference is generated. However if this current step difference cancellation configuration is used, the switching conditions can be more relaxed. Therefore switching to the following control at a more distant position from the target position and at faster velocity is possible than prior art. As a consequence, seek time can be further decreased.

Description of Two Degree of Freedom Control System

Figure 8:
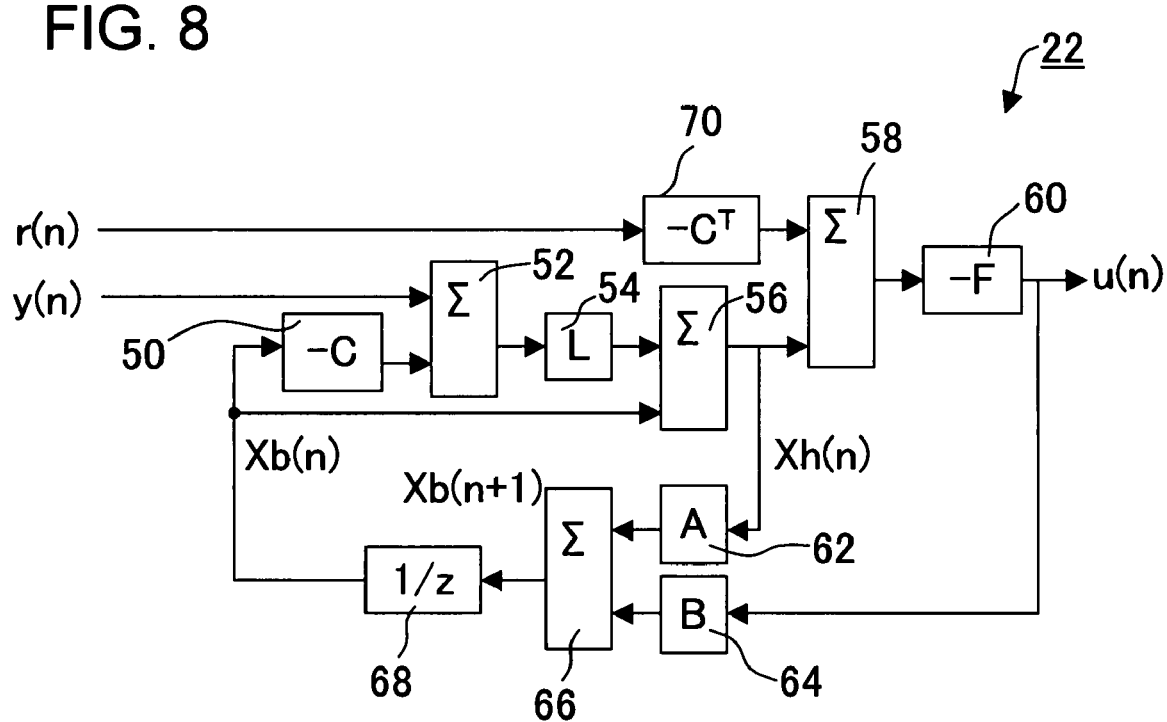
FIG. 8 is a block diagram depicting the following controller in FIG. 5.

FIG. 8 is a block diagram depicting the following controller 22 in FIG. 5, and shows a two degree of freedom position control system using a current observer. First the current observer will be described. The actuator of the magnetic disk device is a rotation type. However this can be converted into and expressed as a state equation of a linear actuator shown in Expression (1). Here 'x' is a position (m), 'v' is a velocity (m/s), 'u' is a current (Ampere), Bl is a force constant (N/m), 'm' is an equivalent mass (kg), 'u' is an output, and 's' is a Laplace operator.

$$s\begin{pmatrix} x \\ v \end{pmatrix} = \begin{pmatrix} 0 & 1 \\ 0 & 0 \end{pmatrix}\begin{pmatrix} x \\ v \end{pmatrix} + \frac{Bl}{m}\begin{pmatrix} 0 \\ 1 \end{pmatrix}u \tag{1}$$

If the sampling cycle is T(s), the maximum value of the current is Imax (Ampere), and the track width is Lp (m/Track), and the unit of position is converted into tracks, the unit of velocity into track/sample, and the unit of current into Imax="1", and Expression (1) is expressed as a digital state equation, then the following Expression (2) is acquired.

$$\begin{pmatrix} x(n+1) \\ v(n+1) \end{pmatrix} = \begin{pmatrix} 1 & 1 \\ 0 & 1 \end{pmatrix}\begin{pmatrix} x(n) \\ v(n) \end{pmatrix} + \frac{Bl}{m}\frac{I_{MAX}}{Lp}T^2\begin{pmatrix} 1/2 \\ 1 \end{pmatrix}u(n) \tag{2}$$

Now in order to estimate a steady state bias, the following Expression (3), where the steady state bias is constant, is assumed. Here 's' is a Laplace operator.

$$sb=0 \tag{3}$$

This is converted into a digital space, and the following Expression (4) is acquired.

$$b(n+1)=b(n) \tag{4}$$

As a disturbance model, the characteristics of the quadratic expression of the following Expression (5) are set.

$$\frac{1}{s^2 + 2\varsigma\omega s + \omega^2} \tag{5}$$

The analog state equation of the disturbance model of Expression (5) is expressed as the following Expression (6).

$$s\begin{pmatrix} d1 \\ d2 \end{pmatrix} = \begin{pmatrix} 0 & -\omega \\ \omega & -2\varsigma\omega \end{pmatrix}\begin{pmatrix} d1 \\ d2 \end{pmatrix} \tag{6}$$

This Expression (6) is converted into a digital space, and the following Expression (7) is acquired.

$$\begin{pmatrix} d1(n+1) \\ d2(n+1) \end{pmatrix} = \begin{pmatrix} Ad11 & Ad12 \\ Ad21 & Ad22 \end{pmatrix}\begin{pmatrix} d1(n) \\ d2(n) \end{pmatrix} \tag{7}$$

If Expression (2), Expression (4) and Expression (7) are integrated into an extended model, the following Expression (8) is acquired. Here both the steady state bias in Expression (4) and the disturbance expressed as the quadratic expression in Expression (7) are included.

$$\begin{pmatrix} x(n+1) \\ v(n+1) \\ b(n+1) \\ d11(n+1) \\ d12(n+1) \\ d21(n+1) \\ d22(n+1) \end{pmatrix} = \begin{pmatrix} 1 & 1 & 1/2 & 1/2 & 0 & 1/2 & 0 \\ 0 & 1 & 1 & 1 & 0 & 1 & 0 \\ 0 & 0 & 1 & 0 & 0 & 0 & 0 \\ 0 & 0 & 0 & a11 & a12 & 0 & 0 \\ 0 & 0 & 0 & a21 & a22 & 0 & 0 \\ 0 & 0 & 0 & 0 & 0 & b11 & b12 \\ 0 & 0 & 0 & 0 & 0 & b21 & b22 \end{pmatrix}\begin{pmatrix} x(n) \\ v(n) \\ b(n) \\ d11(n) \\ d12(n) \\ d21(n) \\ d22(n) \end{pmatrix} + \begin{pmatrix} 1/2 \\ 1 \\ 0 \\ 0 \\ 0 \\ 0 \\ 0 \end{pmatrix}\frac{Bl}{m}\frac{I_{MAX}}{Lp}T^2 u(n) \tag{8}$$

$$y(n) = (1\ 0\ 0\ 0\ 0\ 0\ 0)\begin{pmatrix} x(n) \\ v(n) \\ b(n) \\ d11(n) \\ d12(n) \\ d21(n) \\ d22(n) \end{pmatrix}$$

The extended model, including the model of an actuator in Expression (8), and one or a plurality of disturbance models is/are simplified and expressed as the following Expression (9).

$$X(n+1)=A\cdot X(n)+B\cdot u(n)$$

$$y(n)=C\cdot X(n) \tag{9}$$

Expression (9) is Expression (8) where matrices are simplified using X(n+1), X(n), A, B and C. According to Expression (9), the estimated observer is expressed as the following Expression (10).

$$X(n+1)=A\cdot X(n)+B\cdot u(n)+L\cdot(y(n)-C\cdot X(n))$$

$$u(n)=-F\cdot X(n) \tag{10}$$

This expression is an expression of the analog control observer directly converted into a digital expression, where L is a state estimation gain, which consists of four state estimation gains, that is, position, velocity, bias and disturbance (five state estimation gains in the case of Expression (8) since there are two disturbances). F is a feedback gain, and consists of five feedback gains.

In this expression, the observation position y(n) is not reflected to the current output u(n) of the current sample. In other words, the response delays one sample since this is a estimated observer format. To compensate for the one sample of delay, the current observer is normally used. The current observer is expression by Expression (11). Here y(n) is an observation position in the current sample.

$$Xh(n)=Xb(n)+L(y(n)-C\cdot Xb(n))$$

$$u(n)=-F\cdot Xh(n)$$

$$Xb(n+1)=A\cdot Xh(n)+B\cdot u(n) \tag{11}$$

In this way, a current observer for performing one operation and changing the drive current once in one sample is constructed. Then based on this current observer, the two degree of freedom control system is constructed.

If feed forward of the two degree of freedom control is added to Expression (11), then Expression (12), Expression (13) and Expression (14) are acquired.

$$Xh(n)=Xb(n)+L(y(n)-C\cdot Xb(n)) \tag{12}$$

$$u(n)=-F\cdot(Xh(n)-C^T\cdot r(n)) \tag{13}$$

$$Xb(n+1)=A\cdot Xh(n)+B\cdot u(n) \tag{14}$$

In other words, compared with Expression (11), (C^T·r(n)), which is a feed forward term, is added to the calculation of the output u(n), as shown in Expression (13). C in Expression (12) and C^T (transposition of C) in Expression (13) are given by the following Expression (15) and Expression (16).

$$C = (1\ 0\ 0\ 0\ 0) \tag{15}$$

$$C^T = \begin{pmatrix} 1 \\ 0 \\ 0 \\ 0 \\ 0 \end{pmatrix} \tag{16}$$

This will be described with reference to the block diagram in FIG. 8. A difference between an observation position y(n) in the current sample n and a predicted position C·Xb(n) in the current sample estimated in the previous sample is computed in a computing block 52, so as to generate an estimated position error er[n]. In a multiplication block 54, this estimated position error er[n] is multiplied by an estimated gain L, so as to generate a correction value.

In an addition block 56, this correction value and Xb[n], such as a predicted position and a predicted velocity, are added. By this, Xh(n), such as an estimated position and estimated velocity in the current sample in Expression (12) is generated. In the case of a normal state feedback, the estimated position of the estimated state Xh(n) is multiplied by a gain, the estimated velocity is multiplied by a gain, and a sum of these is determined to generate a state feedback current.

In the two degree of freedom control, a value resulting when an estimated velocity is multiplied by a gain is still used, but the difference is that a difference value between the estimated position Xh(n) and the target position trajectory r(n) is computed in an addition block 58, and the result is multiplied by a feedback gain F in a multiplication block 60, and the result is used for state feedback. In other words, Expression (13) is computed.

On the other hand, the estimated state Xb(n+1) in the next sample (n+1) is calculated as shown in Expression (14) in the multiplication blocks 62 and 64 and the addition block 66 based on the estimated state Xh(n) in the current sample and the output value u(n).

Here the computing block 70 multiplies a target position trajectory r(n) by the matrix C^T, and the delay block 68 delays the estimated step Xb(n+1) by one sample. A, B, C, C^T, L and F are matrices for the position x, velocity v, bias value b and disturbance values d1 and d2. A, B and L are state estimation gains, and F is a feedback gain.

In the current observer shown by Expression (12), Expression (13), Expression (14) and FIG. 8, the two degree of freedom control can be implemented merely by multiplying the target trajectory r(n) by C^T of Expression (16), and adding the result to the normal current observer.

Now the above mentioned step difference cancellation position trajectory r'(n) in the control system using the two degree of freedom control will be described. At switching to the following control, the target trajectory r(n) of Expression (13) is "0", so the current step difference Udiff is given by the following Expression (17).

$$U\text{diff}=u(n)-u(n-1) \quad (17)$$

In order to cancel the current step difference in the final output using Expression (13), Expression (18) must be satisfied.

$$U\text{diff}=F \cdot C^T \cdot r'(n) \quad (18)$$

Therefore the current step difference cancellation position trajectory r'(n) is given by the following Expression (19).

$$r'(n)=-U\text{diff}/(F \cdot C^T) \quad (19)$$

Therefore if the two degree of freedom current observer is used for the following control, the step difference cancellation position trajectory r'(n) can be calculated easily at high-speed. And the current observer can calculate the output current which does not cause current step difference when the following control starts by the following calculation sequence.

First Xh(n) is calculated by Expression (12). Then in Expression (13), u(n) is calculated assuming r(n) is "0". Based on this calculated u(n) and the final current value u(n−1) of the seek control of the hold circuit 34, the step difference current value Udiff is calculated using Expression (17). Then the initial value of the current step difference cancellation position trajectory r'(n) is calculated using Expression (19).

And the output current u(n) is calculated using Expression (13) assuming r(n) as r'(n), then Xb(n+1) is calculated using Expression (14).

In this way, if the two degree of freedom current observer is used, output current in which the step difference at the point of switching has been cancelled can be output.

Figure 9:
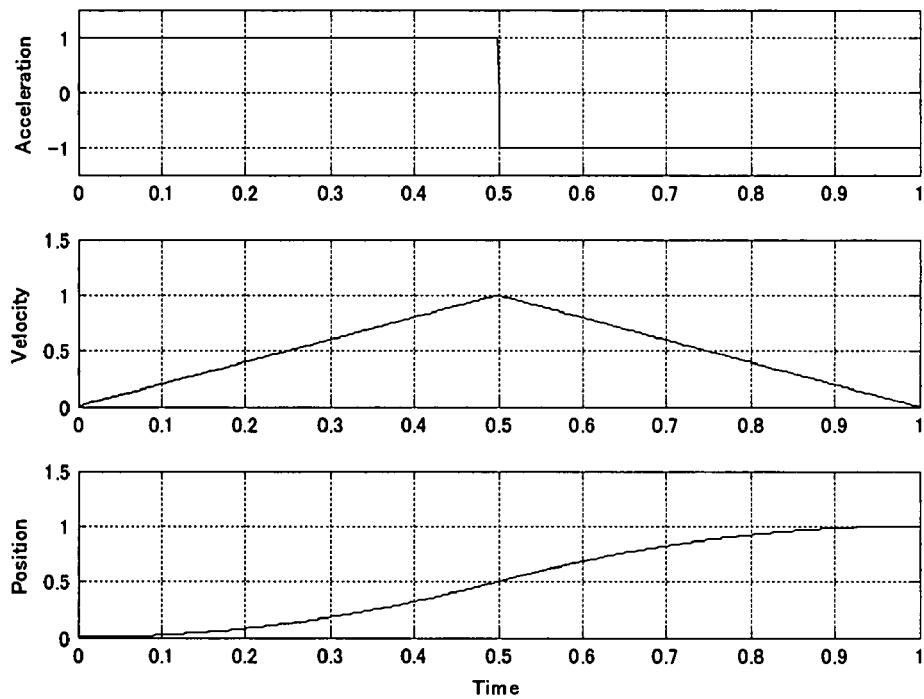
FIG. 9 is a diagram depicting other step difference cancellation trajectory of the present invention.

Now another current step difference cancellation trajectory will be described. FIG. 9 shows a quadratic function trajectory. In FIG. 9, the top shows a characteristic of acceleration, the middle of velocity, and the bottom of position, with respect to time. The quadratic function trajectory is a rectangular wave integrated twice, and the trajectory of the position in FIG. 9 can be used. Compared with the triangular wave in FIG. 6, the quadratic function trajectory presents a little more curved characteristic.

Figure 10:
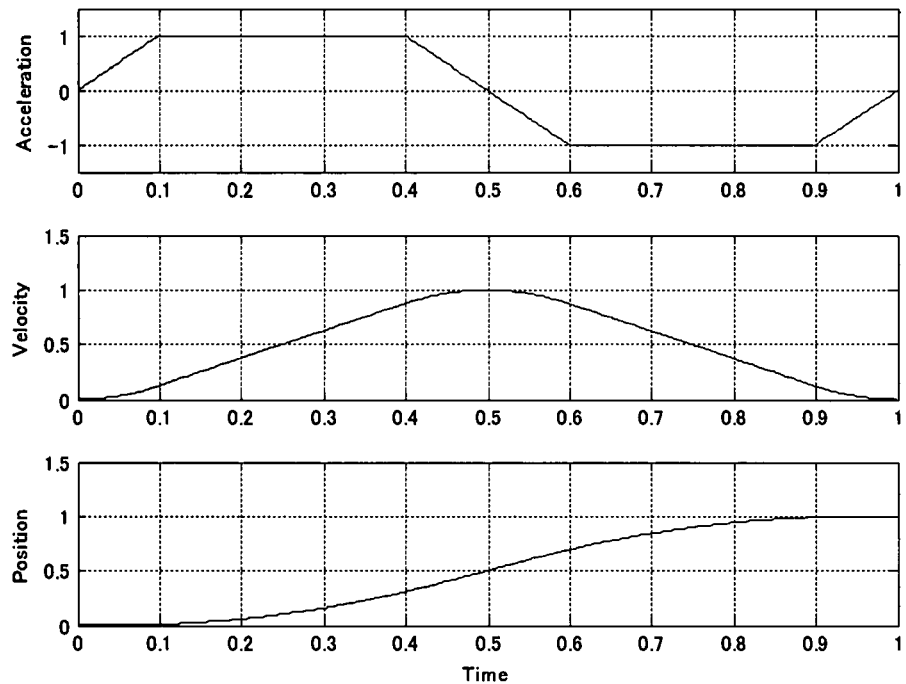
FIG. 10 is a diagram depicting still other step difference cancellation trajectory of the present invention.

FIG. 10 shows a trapezoidal trajectory. In FIG. 10, the top is a characteristic of acceleration, the middle of velocity, and the bottom of position, with respect to time. The trapezoidal position trajectory presents a little more curved position characteristic, compared with the triangular wave in FIG. 6.

Figure 11:
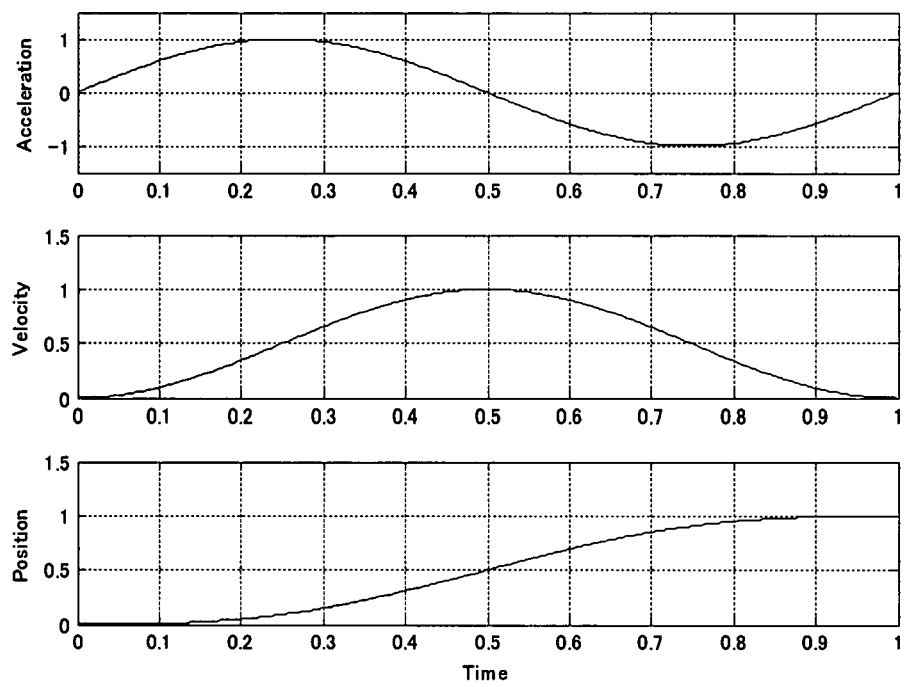
FIG. 11 is a diagram depicting still other step difference cancellation trajectory of the present invention.

FIG. 11 is a sine wave trajectory. In FIG. 11, the top is a characteristic of acceleration, the middle of velocity, and the bottom of position, with respect to time. The sine wave position trajectory presents a little more curved position characteristic, compared with the triangular wave in FIG. 6.

Figure 12:
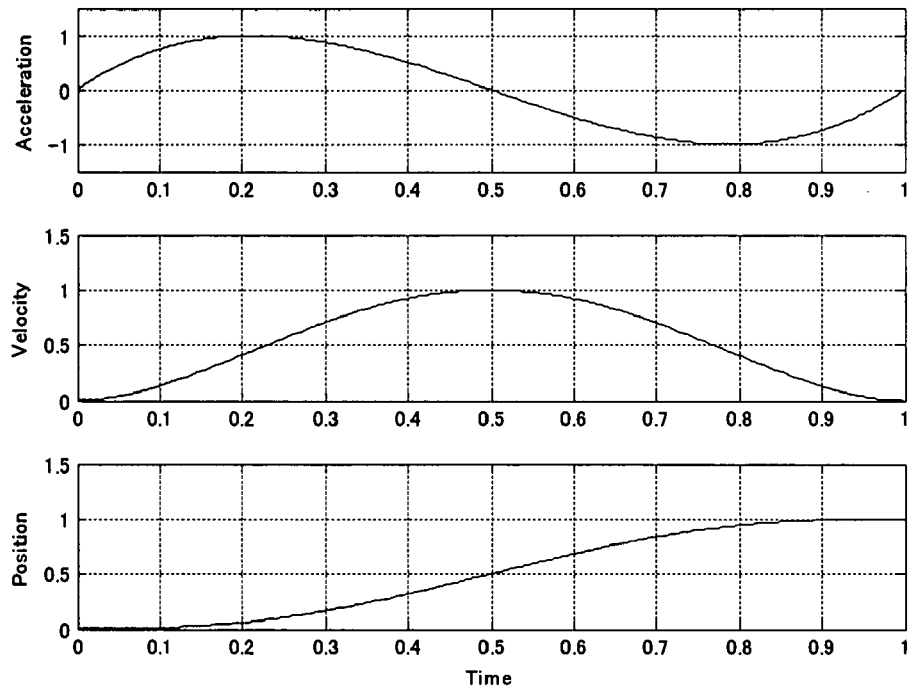
FIG. 12 is a diagram depicting still other step difference cancellation trajectory of the present invention.

FIG. 12 shows a SMART trajectory. In FIG. 12, the top is a characteristic of acceleration, the middle of velocity, and the bottom of position, with respect to time. The SMART trajectory is an improved sine wave trajectory introduced in the above mentioned Patent Document 1. The SMART trajectory presents a little more curved position characteristic compared with the triangular wave in FIG. 6.

Figure 13:
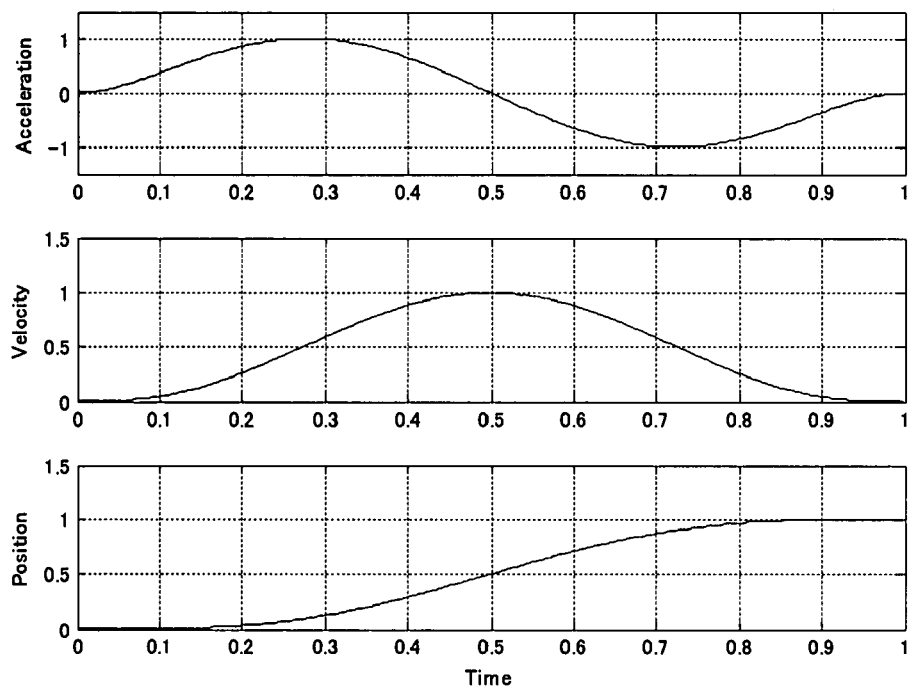
FIG. 13 is a diagram depicting still other step difference cancellation trajectory of the present invention.

FIG. 13 shows a SMART-Like trajectory. FIG. 13 shows a characteristic of acceleration, the middle of velocity, and the bottom of position, with respect to time. The SMART-Like trajectory is a further improved sine wave trajectory, introduced in Patent Document 2, and presents a little more curved position characteristic compared with the triangular wave in FIG. 6.

In this way, the initial value is set to r'(n), and various forms of step difference cancellation loci can be used according to the required characteristics.

Second Embodiment of Position Control System

Figure 14:
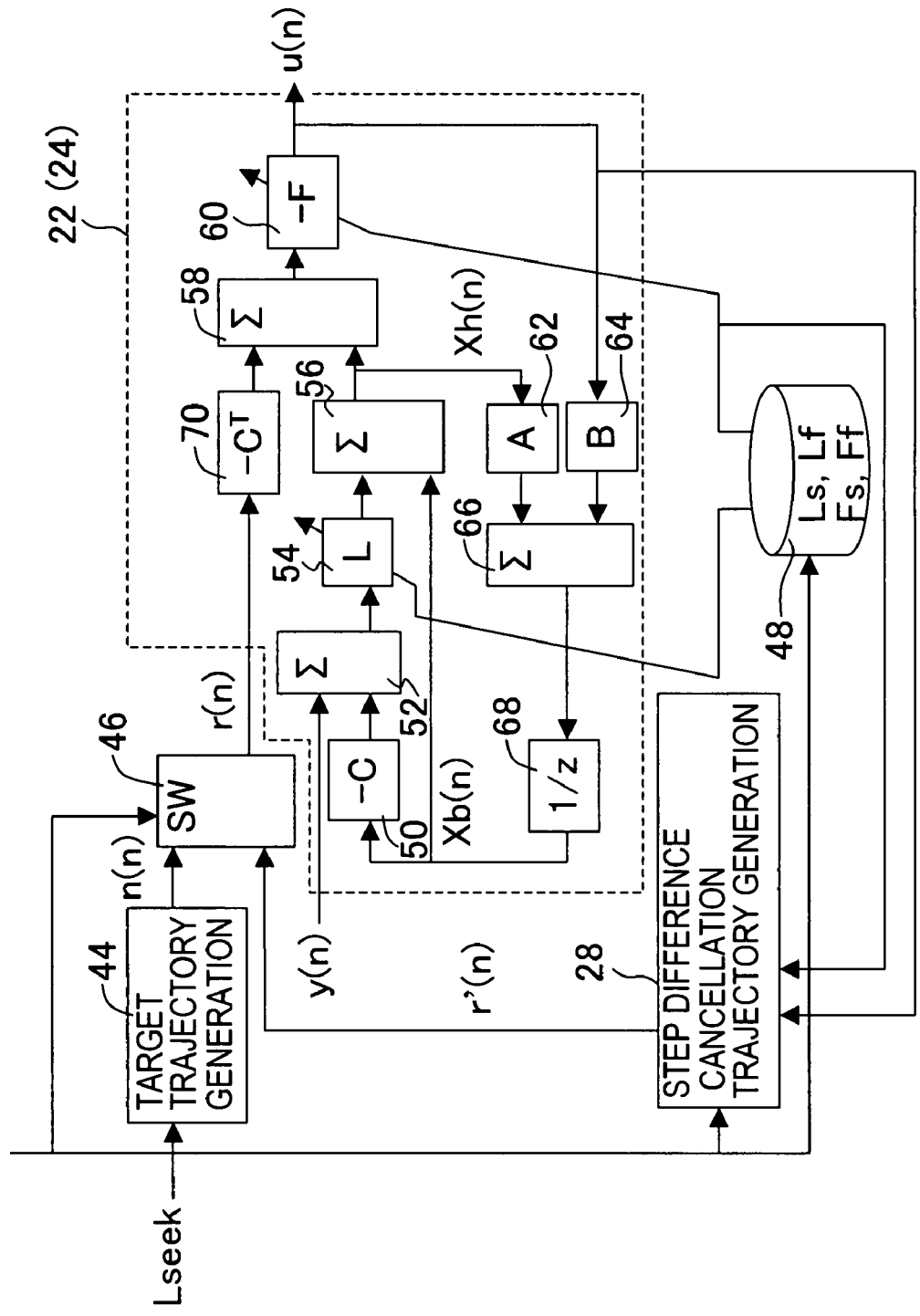
FIG. 14 is a block diagram depicting a current observer of the position control system according to the second embodiment of the present invention.

FIG. 14 is a block diagram depicting the position control system according to the second embodiment of the present invention, and composing elements the same as FIG. 5 and FIG. 8 are denoted with the same reference symbols. One of the advantages of the two degree of freedom control is that the seek control and following control are implemented by a same configuration. In this embodiment, the basic configuration in FIG. 5 is used, but the seek controller 24 and the following controller 22 are constructed by one current observer.

In FIG. 14, controllers 22 and 24 constitute one current observer. The configuration of this current observer is the same as shown in FIG. 8. The computing block 52 computes a difference between an observation position y(n) in a current sample n and a estimated position C·Xb(n) in a current sample estimated in a previous sample, so as to generate an estimated position error er[n].

In a multiplication block 54, this estimated position error er[n] is multiplied by an estimated gain L, so as to generate a correction value. In an addition block 56, this correction value and Xb[n], such as a predicted position and predicted velocity, are added. By this, Xh(n), such as an estimated position and estimated velocity in the current sample, is generated using Expression (12).

In the two degree of freedom control, a difference value between the estimated position Xh(n) and the target position trajectory r(n) is computed in an addition block 58, and the result is multiplied by a feedback gain F in a multiplication block 60, and this result is used for a state feedback. In other words, Expression (13) is computed.

On the other hand, an estimated state Xb(n+1) in the next sample (n+1) is calculated in multiplication blocks 62 and 64 and an addition block 66 based on the estimated state Xh(n) in the current sample and the output value u(n), using Expression (14). Here a computing block 70 multiplies the target position trajectory r(n) by a matrix C^T, and a delay block 68 delays the estimated state Xb(n+1) by one sample.

The current observer shown by Expression (12), Expression (13), Expression (14) and FIG. 14 as well, can implement the two degree of freedom control merely by multiplying the target trajectory r(n) by C^T of Expression (16) and adding the result to the normal current observer.

This position control system also has a target trajectory generation section 44 for generating a target trajectory r(n) based on a target position (or moving distance) Lseek, and a current step difference cancellation trajectory generation section 28 for generating a current step difference cancellation trajectory r'(n) according to the difference between a current value u(n−1) at sample time before switching and a current output value u(n) at sample time after switching. And this position control system also has a switch 46 for switching the target trajectory r(n) of the target trajectory generation section 44 to the current step difference cancellation trajectory r'(n) of the current step difference cancellation trajectory generation section 28 according to the instruction to switch seek control to following control, and outputting r'(n) to the computing block 70.

This position control system also has a setting table 48 for changing the control characteristics of one current observer depending on whether it is seek control or following control. The setting table 48 stores a state estimation gain Ls and feedback gain Fs for seek control, and a state estimation gain Lf and feedback gain Ff for following control.

And in the setting table 48, the state estimation gain Ls and feedback gain Fs for seek control are set in the computing blocks 54 and 60 in the case of seek control, and sets the state estimation gain Lf and feedback gain Ff for following control in the computing blocks 54 and 60 in the case of following control, according to the switching instruction from seek control to following control.

According to the operation of this configuration, in the seek control, the target trajectory r(n) from the target trajectory generation section 44 is input to the computing block 70 via the switch 46, and the state estimation gain Ls and feedback gain Fs for seek control are set in the computing blocks 54 and 60 from the setting table 48.

And as described in FIG. 8, Expression (12), Expression (13) and Expression (14) are computed, the output current value u(n) is calculated, and the plant 40 (1, 3) is driven.

When the settling judgment section 26 (see FIG. 5) judges that the position error e satisfies a predetermined settling judgment condition (e.g. zero), the settling judgment section 26 judges that the object reached near the target position, and switches the seek control to the following control. In other words, the state estimation gain Lf and feedback gain Ff for following control are set in the computing blocks 54 and 60 from the setting table 48.

And as described in FIG. 8, the step difference cancellation trajectory generation section 28 computes Expression (19) to generate the step difference cancellation trajectory r'(n), and switches the switch 46. And as described in FIG. 8, Expression (12), Expression (13) and Expression (14) are computed, the output current value u(n) is calculated, and the plant 40 (1, 3) is driven.

In this way, by using the two degree of freedom current observer also for seek, the seek, following and step difference cancellation control can be implemented by a simpler configuration.

Also if the estimated position in the estimated state Xb(n) of Expression (12) is replaced with the position error y(n) at that point when seek control is switched to following control, the step difference can be cancelled more accurately. In other words, the setting is performed so that the estimated position error in the sample immediately after seek control is switched to following control becomes "0".

Figure 15:
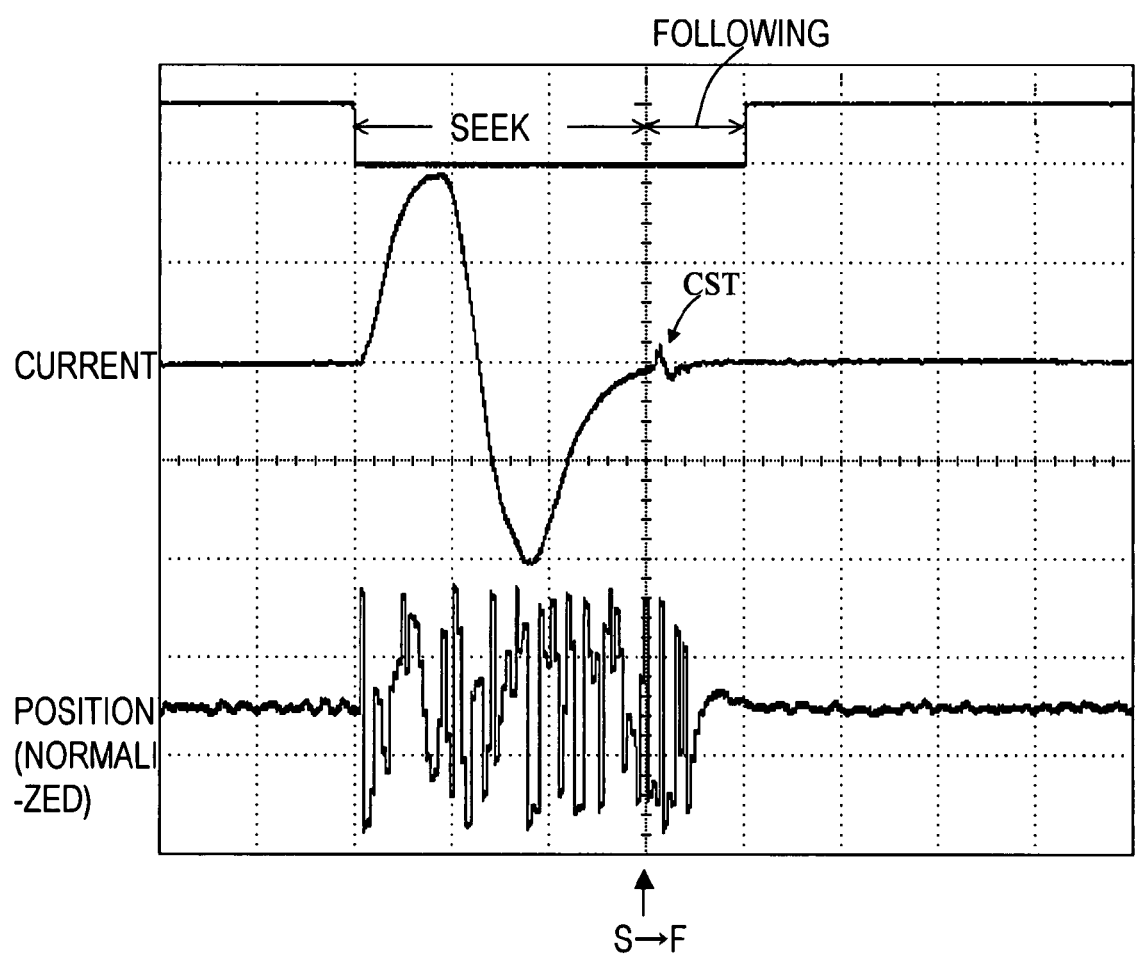
FIG. 15 is a diagram depicting a comparison example of the present invention.

Now an example of an experiment conducted using an actual 2.5 inch magnetic disk device will be described. FIG. 15 is a characteristics diagram of a current waveform and position in a conventional position control system where the current step difference is not cancelled, and FIG. 16 is a characteristics diagram of the current waveform and position in a control system according to the present invention where the current step difference is cancelled.

Figure 16:
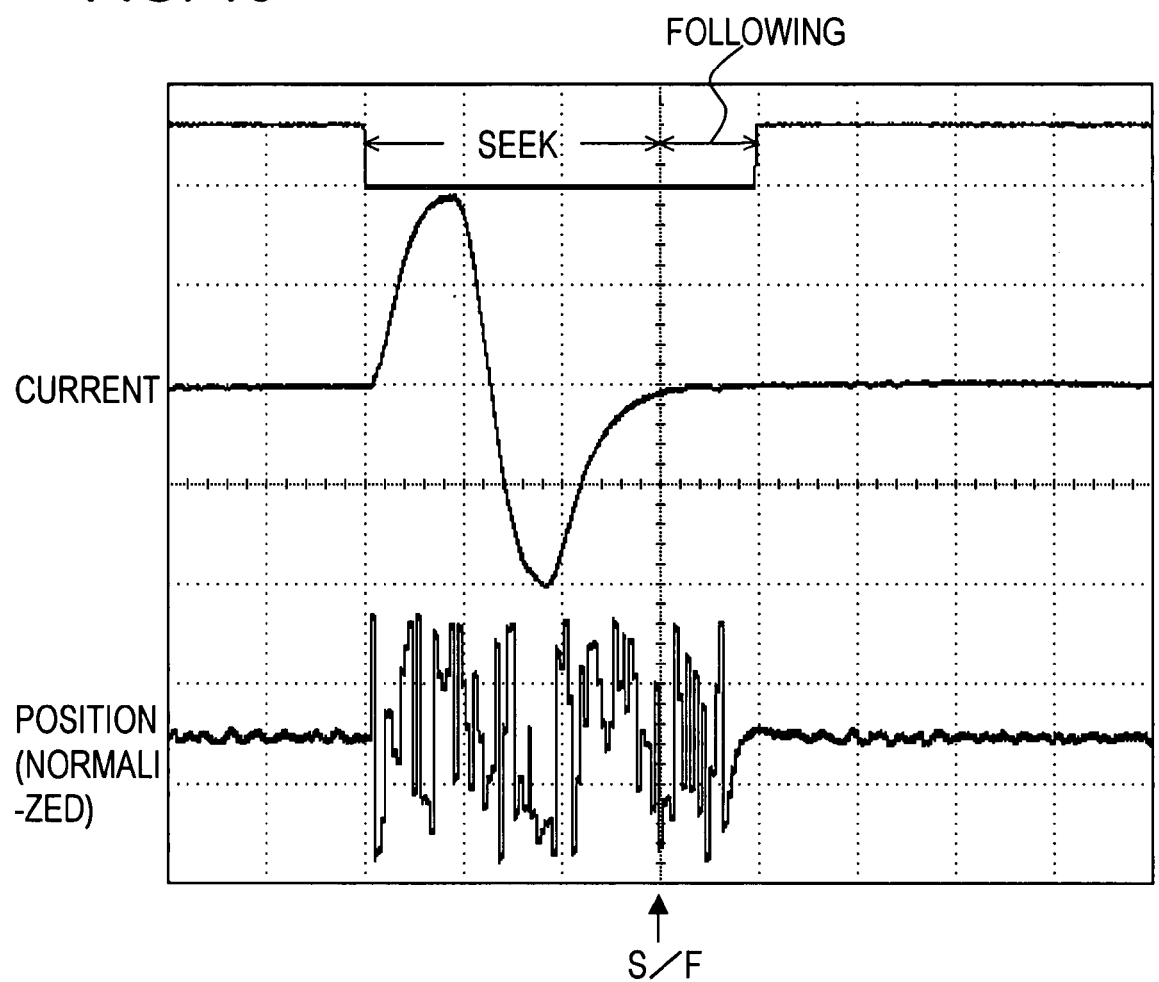
FIG. 16 is a characteristic diagram of an example of the present invention.

Both FIG. 15 and FIG. 16 show seek time, current waveform and position error waveform from the top. The position error here repeats in a ±1 range. In FIG. 15, the current step difference CST is seen in the seek waveform when seek control is switched to following control, but in FIG. 16, a current step difference is not seen in the seek waveform.

As described above, in prior art, the generation of the current step difference as seen in FIG. 15 causes noise. Also the restriction of position and velocity in the conditions when seek control is switched to following control is tight. However if the means of solving the current step difference of the present invention is used, the generation of noise can be prevented, and the conditions can be relaxed more, and switching to the following control at a more distant position from the target position and at faster velocity is possible than prior art. As a consequence, seek time can be further decreased than that shown in FIG. 16.

Third Embodiment of Position Control System

Figure 17:
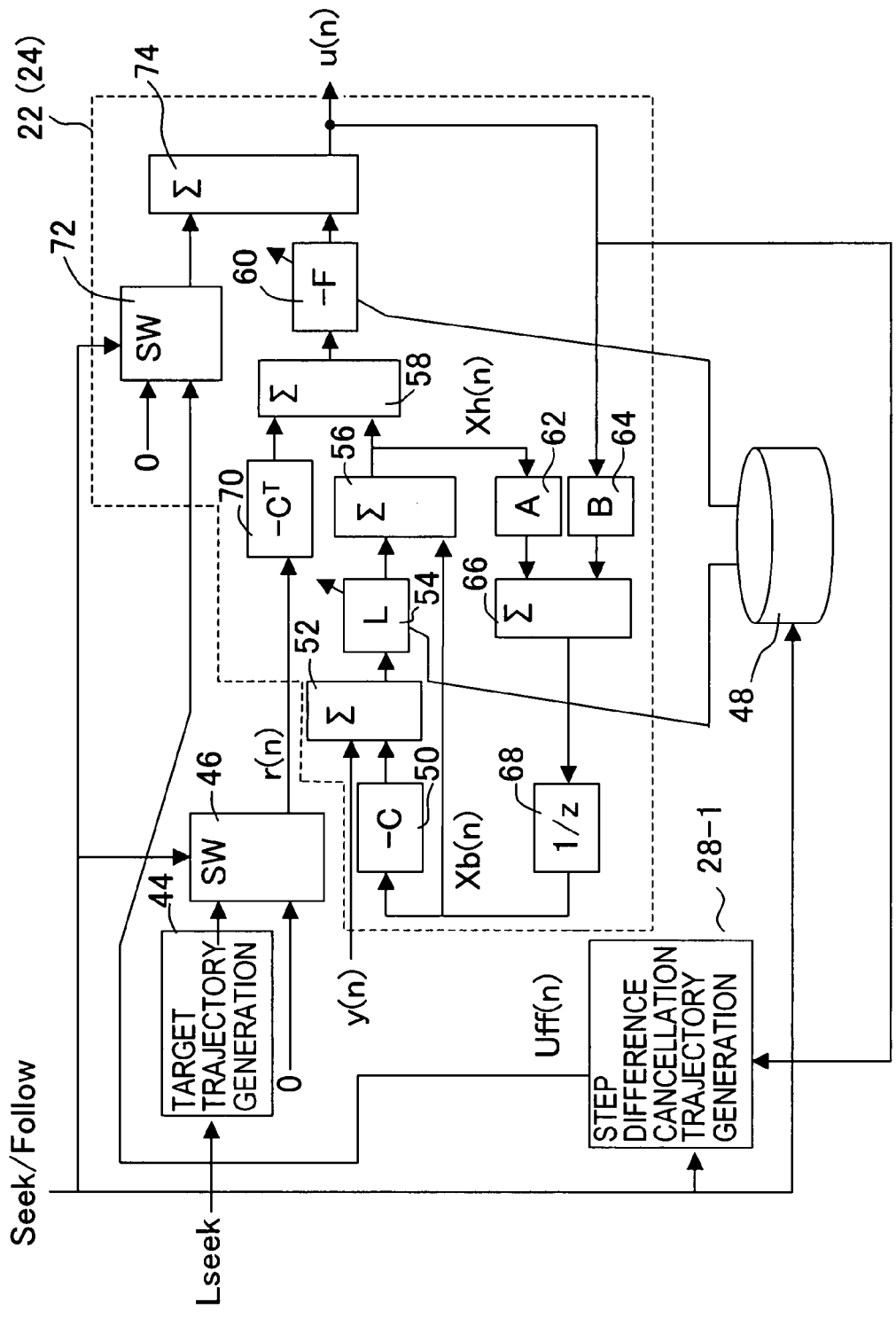
FIG. 17 is a block diagram depicting a current observer of the position control system according to the third embodiment of the present invention.

FIG. 17 is a block diagram depicting the position control system according to the third embodiment of the present invention, and composing elements the same as FIG. 5, FIG. 8 and FIG. 14 are denoted with the same reference symbols. From Expression (13) to Expression (19) the step difference cancellation trajectory r'(n) is generated based on the current step difference Udiff, but the current step difference itself may be supplied as the current trajectory. In other words, Expression (14) is transformed to the following Expression (20), and the step difference cancellation trajectory is supplied using current.

$$u(n) = -F \cdot Xh(n) + Uff(n) \qquad (20)$$

In FIG. 17, controllers 22 and 24 constitute one current observer. The configuration of this current observer is the same as the configuration shown in FIG. 8. A difference between an observation position y(n) in a current sample n and a predicted position C·Xb(n) in a current sample estimated in a previous sample is computed in a computing block 52, so as to generate an estimated position error er[n].

In a multiplication block 54, this estimated position error er[n] is multiplied by an estimated gain L so as to generate a correction value. In an addition block 56, this correction value and Xb[n], such as a predicted position and predicted velocity, are added. By this, Xh(n), such as an estimated position and estimated velocity in the current sample, is generated using Expression (12).

In the two degree of freedom control, a difference value between the estimated position Xh(n) and the target position trajectory r(n) is computed in an addition block 58, and the result is multiplied by a feedback gain F in a multiplication block 60, and this result is used for a state feedback. In other words, Expression (13) is computed.

On the other hand, an estimated state Xb(n+1) in the next sample (n+1) is calculated in multiplication blocks 62 and 64 and an addition block 66 based on the estimated state Xh(n) in the current sample and the output value u(n), using Expression (14). Here a computing block 70 multiplies the target position trajectory r(n) by a matrix C^T, and a delay block 68 delays the estimated state Xb(n+1) by one sample.

The current observer shown in Expression (12), Expression (13), Expression (14) and FIG. 17 as well, can implement the two degree of freedom control merely by multiplying the target trajectory r(n) by C^T of Expression (16) and adding the result to the normal current observer.

This position control system also has a target trajectory generation section 44 for generating a target trajectory r(n) based on a target position (or moving distance) Lseek, and a current step difference calculation trajectory generation section 28-1 for calculating a step difference current value according to a current value u(n−1) at sample time before switching and a current output value u(n) at sample time after switching, and generating a step difference cancellation current trajectory Uff(n) using this step difference current value as an initial value.

And this position control system also has a switch 46 for cutting input of the target trajectory r(n) of the target trajectory generation section 44 according to the instruction to switch seek control to following control, and a switch 72 for switching to the step difference cancellation current trajectory Uff(n) of the current step difference calculation trajectory generation section 28-1 and outputting Uff(n) to the addition block 74.

This position control system also has a setting table 48 for changing the control characteristics of one current observer depending on whether it is seek control or following control. The setting table 48 stores a state estimation gain Ls and feedback gain Fs for seek control, and a state estimation gain Lf and feedback gain Ff for following control.

And in the setting table 48, the state estimation gain Ls and feedback gain Fs for seek control are set in the computing blocks 54 and 60 in the case of seek control, and the state estimation gain Lf and feedback gain Ff for following control are set in the computing blocks 54 and 60 in the case of following control, according to the switching instruction from seek control to follow control.

According to the operation of this configuration, in the seek control, the target trajectory r(n) from the target trajectory generation section 44 is input to the computing block 70 via the switch 46, and the state estimation gain Ls and feedback gain Fs for seek control are set in the computing blocks 54 and 60 from the setting table 48.

And as described in FIG. 8, Expression (12), Expression (13) and Expression (14) are computed, the output current value u(n) is calculated, and the plant 40 (1, 3) is driven.

When the settling judgment section 26 (see FIG. 5) judges that the position error e satisfies a predetermined settling judgment condition (e.g. zero), the settling judgment section 26 judges that the object reached near the target position, and switches the seek control to the following control. In other words, the state estimation gain Lf and feedback gain Ff for following control are set in the computing blocks 54 and 60 from the setting table 48.

Figure 18:
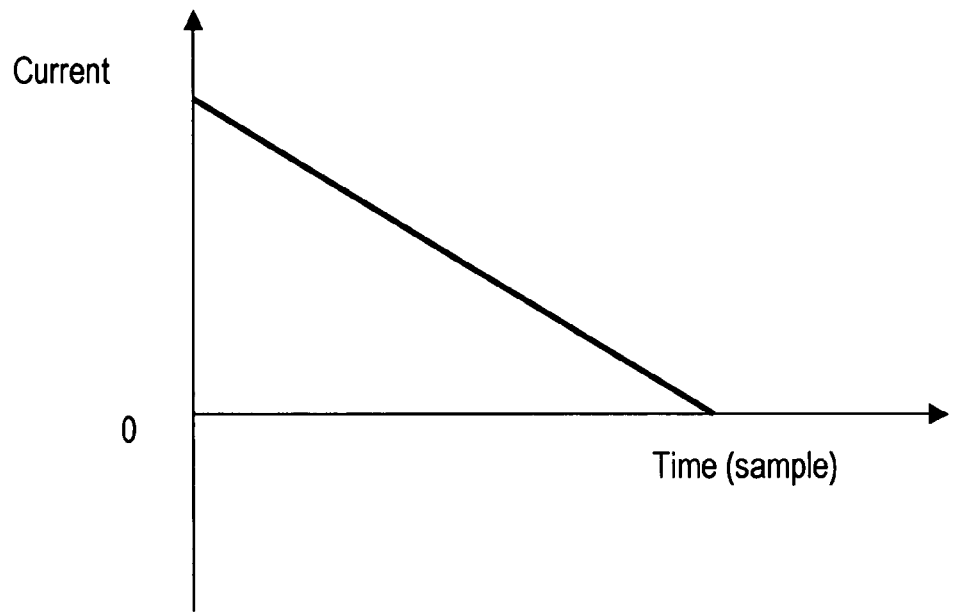
FIG. 18 is a diagram depicting the current trajectory of the position control system according to the third embodiment of the present invention.

And as described in FIG. 8, the step difference cancellation trajectory generation section 28 computes Expression (17) to generate the step difference cancellation trajectory Uff(n), and switches the switches 46 and 72. FIG. 18 is a diagram depicting the current trajectory Uff(n). The current trajectory Uff(n), of which the initial value is the computing result of Expression (17) and which becomes "0" in 10 samples, for example, is generated. Here a triangular wave is used, but another trajectory such as a quadratic function trajectory, can also be used, just like the above mentioned case of the position trajectory.

Also as described in FIG. 8 and FIG. 14, Expression (12), Expression (20) and Expression (14) are computed, the output current value u(n) is calculated, and the plant 40 (1, 3) is driven.

In this way, the present invention can also be implemented by providing the current trajectory instead of the position trajectory. And by also using the two degree of freedom current observer for seek control, the seek, following and step difference cancellation control can be implemented by simpler configuration.

Fourth Embodiment of Position Control System

Figure 19:
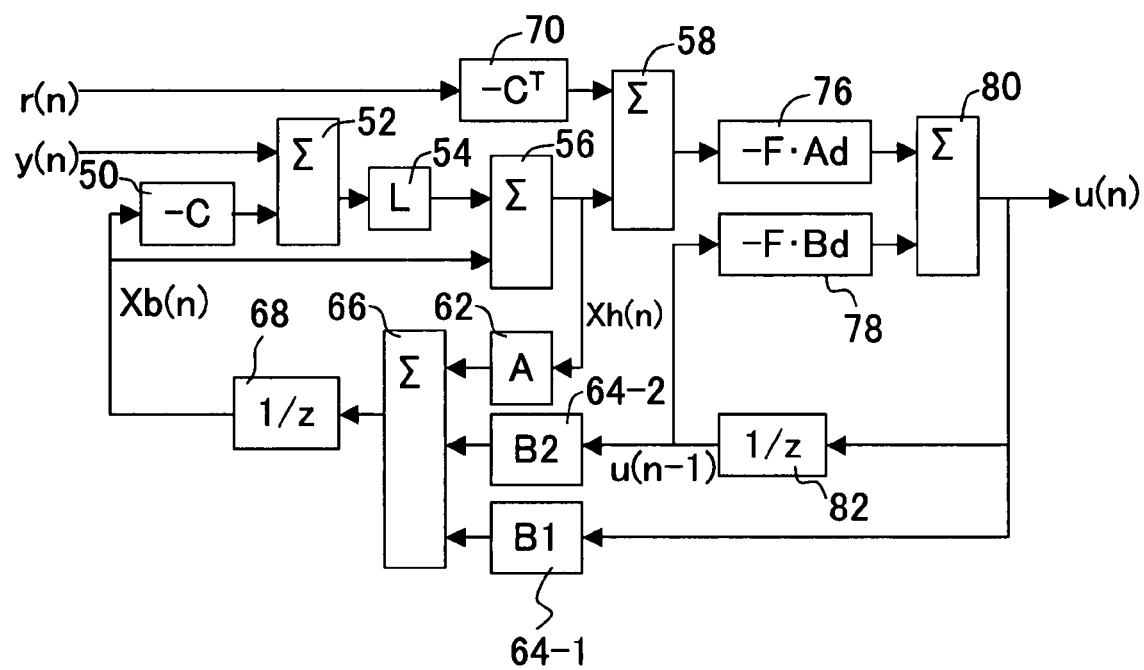
FIG. 19 is a block diagram depicting a current observer of the position control system according to the fourth embodiment of the present invention.

FIG. 19 is a block diagram depicting the fourth embodiment of the position control system of the present invention, where only a current observer is shown. According to this embodiment, in a sample servo control, a delay is generated from a sample time to output because of the calculation time and delay of an analog driver circuit. This means that an output delay is generated.

In this embodiment, a configuration of a current observer considering the output delay is shown. Therefore this two degree of freedom control current observer can be applied to both the following controller in FIG. 5 and FIG. 8 and to the configuration shared for seek and following in FIG. 14 and FIG. 17.

First the state variable X at a time delayed (advanced) by Td from the sample time n is determined in the same way as Expression (9), then this is expressed as the following Expression (21).

$$X(n+Td/T)=Ad \cdot X(n)+Bd \cdot u(n-1) \quad (21)$$

If Expression (21) is expressed as the model of the actuator, just like Expression (2), then this is expressed as Expression (22). In Expression (22), Td, which is a time unit, is converted into sample count n, by dividing Td by the sampling cycle T.

$$\begin{pmatrix} x(n+Td/T) \\ v(n+Td/T) \end{pmatrix} = \begin{pmatrix} 1 & Td/T \\ 0 & 1 \end{pmatrix}\begin{pmatrix} x(n) \\ v(n) \end{pmatrix} + \frac{Bl}{m}\frac{I_{MAX}}{Lp}T^2\begin{pmatrix} Td^2/T^2/2 \\ Td/T \end{pmatrix}u(n-1) \quad (22)$$

The steady state bias b, which is always constant, is given by the following Expression (23).

$$b(n+Td/T)=b(n) \quad (23)$$

Other disturbance models can be transformed in the same way as Expression (6) and Expression (7) according to Expression (5). For this transformation, z-transformation is used. If the above mentioned Expression (10) of the current observer and the above mentioned expression are combined, the following Expression (24) can be constructed.

$$Xh(n)=Xb(n)+L(y(n)-C \cdot Xb(n))$$

$$Xh(n+Td/T)=Ad \cdot Xh(n)+Bd \cdot u(n-1)$$

$$u(n)=-F \cdot Xh(n+Td/T)$$

$$Xb(n+1)=A \cdot Xh(n)+B1 \cdot u(n)+B2 \cdot u(n-1) \quad (24)$$

In Expression (24), Xh(n) is an estimated state in the current sample n, and Xh(n+Td/T) is an estimated state advanced by Td from the current sample n.

In Expression (24), the estimated state Xh(n) in the current sample n is determined, then the state Xh(n+Td/T) advanced by time Td, considering delay, is calculated based on the estimated state Xh(n) in the current sample n and the output value u(n−1) in the previous sample.

Here in order to estimate the state in the next sample, the output u(n) in the current sample is normally used as shown in Expression (11), but in this example, which is single rate control where output is once in one sample, u(n) is not calculated at a sample point of time. Therefore the already calculated output u(n−1) in the previous sample is used, and the state Xh(n+Td/T) advanced by time Td is calculated. And based on the calculated state Xh(n+Td/T) advanced by time Td, the output u(n) in the current sample n is calculated.

For the estimated state Xb(n+1) of the next sample, u(n) and u(n−1) are used for Expression (24), unlike Expression (10). Here the position x(n+1) and velocity v(n+1) of the estimated state Xb(n+1) of Expression (24) are given by the following Expression (25).

$$\begin{pmatrix} x(n+1) \\ v(n+1) \end{pmatrix} = \begin{pmatrix} 1 & 1 \\ 0 & 1 \end{pmatrix} \begin{pmatrix} x(n) \\ v(n) \end{pmatrix} + \frac{Bl}{m}\frac{I_{MAX}}{Lp}\left\{\begin{pmatrix} (T-Td)^2/2 \\ T(T-Td) \end{pmatrix} u(n) + \begin{pmatrix} (2T-Td)Td/2 \\ T \cdot Td \end{pmatrix} u(n-1)\right\} \quad (25)$$

The coefficient u(n) of Expression (25) is B1 of Expression (24), and the coefficient of u(n−1) thereof is B2 of Expression (24).

If feed forward of two degree of freedom control is added to Expression (24), Expression (26) is acquired. In other words, compared with Expression (24), (C^T·r(n)), which is a feed forward term, is added to the calculation of Xh(n+Td/T).

$Xh(n)=Xb(n)+L(y(n)-C\cdot Xb(n))$ $Xh(n+Td/T)=Ad\cdot(Xh(n)\cdot C^T\cdot r(n))+Bd\cdot u(n-1)$ $u(n)=-F\cdot Xh(n+Td/T)$ $Xb(n+1)=A\cdot Xh(n)+B1\cdot u(n)+B2\cdot u(n-1)$ (26)

In this case, according to Expression (13) of conventional two degree of freedom control, the feed forward term is directly added to the calculation expression of the output u(n). However if this is used, (C^T·r(n)) is subtracted from Xh(n+Td/T) at a different sample point of time, which makes the calculation sequence complicated and high-speed computation difficult. Also the state estimation sequence changes, and maintaining the stability of the entire system may become difficult.

Therefore the feed forward term (C^T·r(n)) is added to Xh(n) at a same sample point of time, and Xh(n+Td/T) in an advanced state is calculated.

Also the second expression of Expression (26) is substituted for the third expression to simplify Expression (26), and the following Expression (27) is acquired.

$Xh(n)=Xb(n)+L(y(n)-C\cdot Xb(n))$ $u(n)=-F\cdot Ad\cdot(Xh(n)-C^T\cdot r(n))-F\cdot Bd\cdot u(n-1)$ $Xb(n+1)=A\cdot Xh(n)+B1\cdot u(n)+B2\cdot u(n-1)$ (27)

FIG. 19 is a block diagram when Expression (27) is blocked. Composing elements the same as those in FIG. 8, FIG. 14 and FIG. 17 are denoted with the same reference symbols. As FIG. 19 shows, the observation position (position error) y(n) in the current sample n is loaded, and the difference between the predicted position C·Xb(n) in the current sample estimated in the previous sample and the observation position y(n) is computed in the computation block 52, and the estimated position error er[n] is generated. This estimated position error er[n] is multiplied by the estimated gain L in the multiplication block 54, so as to generate a correction value.

In the addition block 56, this correction value and estimated state Xb[n], such as a predicted position and predicted velocity, in the current sample, are added. By this, the estimated state Xh(n), such as the estimated position and estimated velocity, in the current sample of Expression (27), is generated.

And in the two degree of freedom control, the difference value between the estimated state (position) Xh(n) and the target position trajectory r(n) is computed in the addition block 58, and the result is multiplied by a coefficient matrix −F·Ad in the multiplication block 76. On the other hand, the output u(n−1) in one sample before, delayed by the delay block 82, is multiplied by a coefficient matrix −F·Bd in the multiplication block 78. And this result and the result of the multiplication block 76 are added in the addition block 80, so as to compute an output value u(n) of the second expression of Expression (27).

On the other hand, the estimated state Xb(n+1) in the next sample (n+1) is calculated as shown in the third expression of Expression (27) in the multiplication blocks 62, 64-1 and 64-2 and the addition block 66 based on the estimated state Xh(n) in the current sample, output value u(n) and the output value u(n−1) in the previous sample delayed by the delay block 34.

The estimated state Xb(n+1) in the next sample (n+1) is delayed in the delay block 68, and in the multiplication block 50, the output of the delay block 68 is multiplied by C so as to calculate the estimated position x(n) in the current sample.

As described above, in a two degree of freedom control system for preventing overrun, the delay of output of the two degree of freedom control (computing delay and hardware delay of drive amplifier, D/A converter, etc.) is considered, and the estimated state of Td which is advanced by the amount of delay from the sample point of time is computed, then the output is computed based on this estimated state, so even if state changes during calculation from the sample point of time, the influence of an output delay can be prevented, therefore highly accurate position control is possible, and overrun can be prevented.

Also since the two degree of freedom terms are calculated at a same sample time, the calculation sequence becoming complicated can be prevented, and calculation can be performed at high-speed. Also the state estimation sequence can be adhered to, so stability of the entire system can be maintained.

Fifth Embodiment of Position Control System

Figure 20:
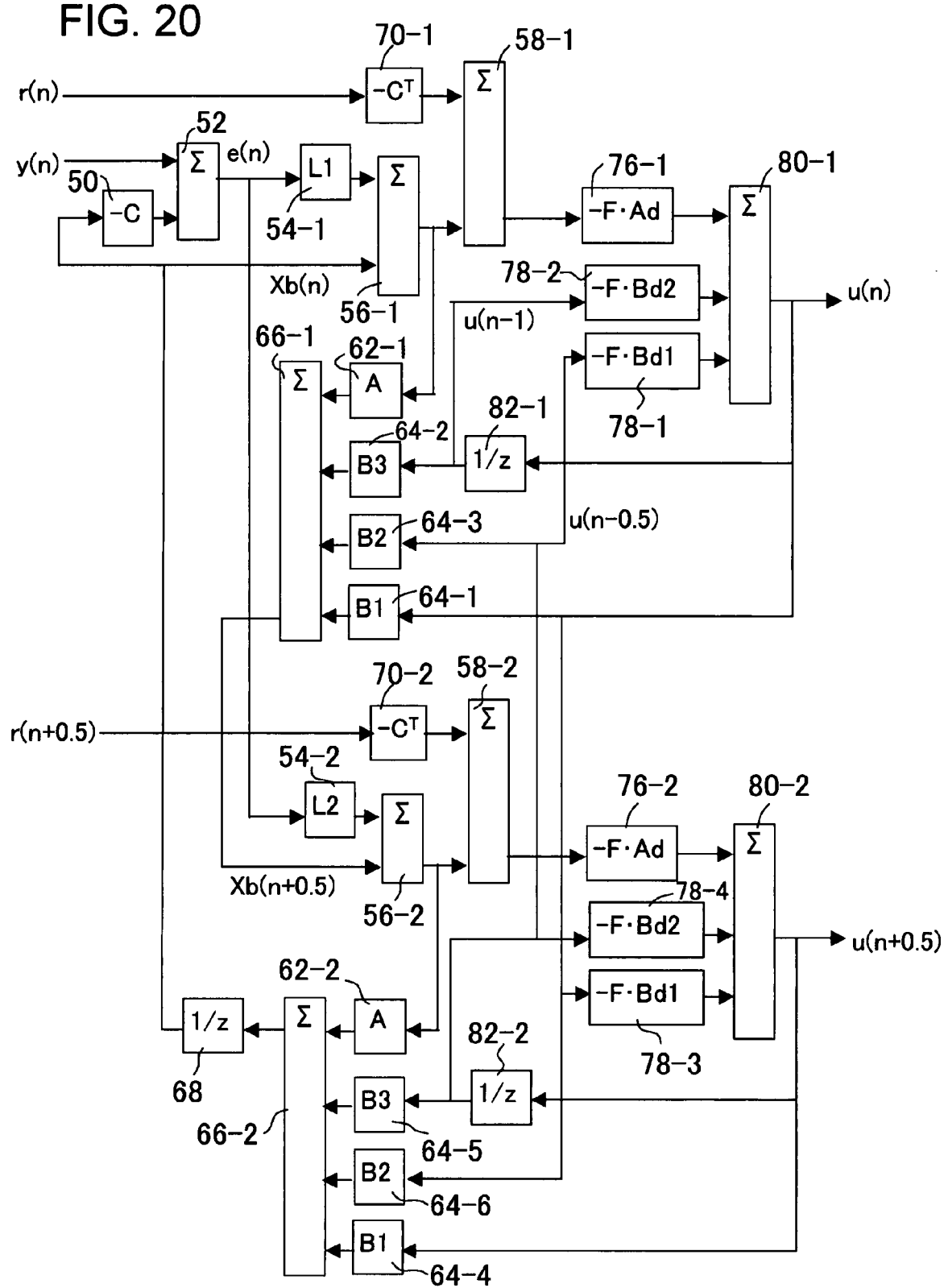
FIG. 20 is a block diagram depicting a current observer of the position control system according to the fifth embodiment of the present invention.
Figure 21:
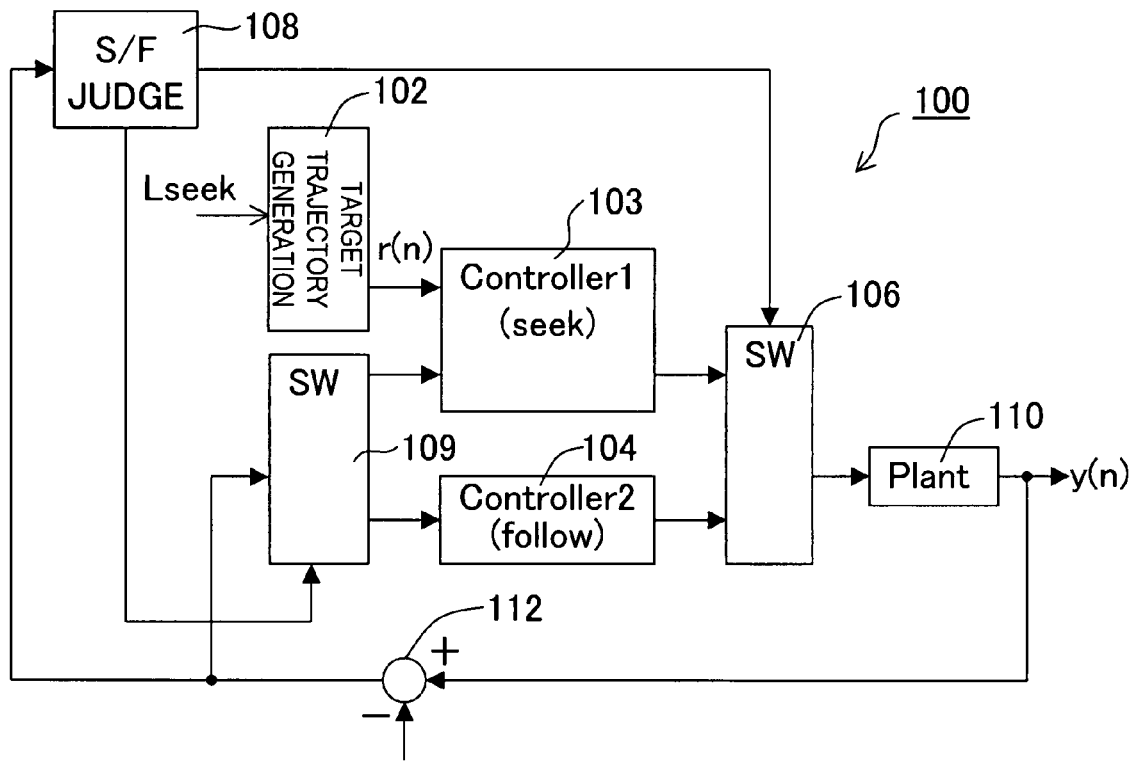
FIG. 21 is a block diagram depicting a seek control device of a prior art.
Figure 22:
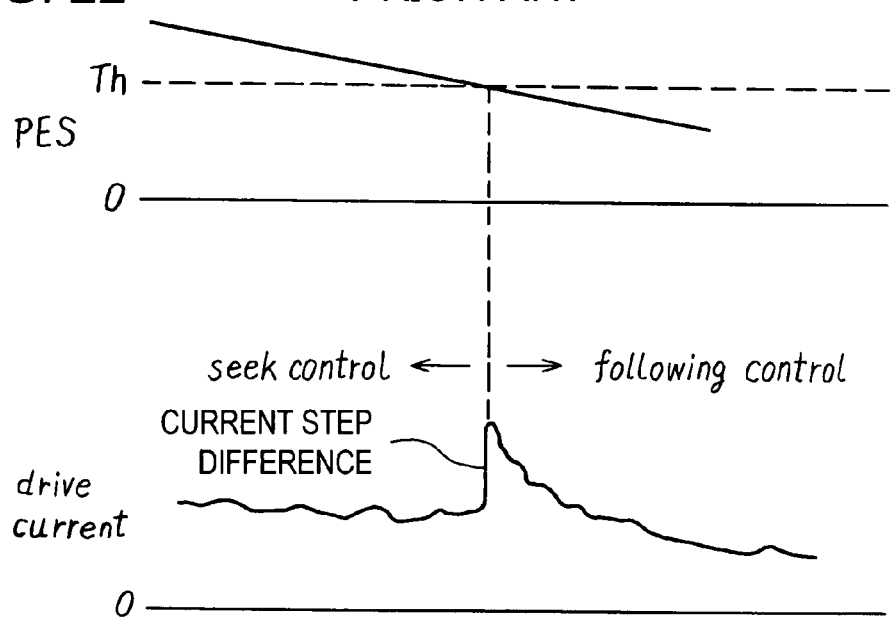
FIG. 22 is a diagram depicting the current step difference at switching according to the prior art.

FIG. 20 is a block diagram depicting the two degree of freedom position control system according to the fifth embodiment of the present invention. Multi-rate control changes current twice or three times in one sample. Changing twice is referred to as "double multi-rate configuration", and changing three times is referred to as "triple multi-rate configuration".

The multi-rate control has a single rate state estimation for estimating the state at a single rate and a multi-rate state estimation for estimating state at a multi-rate. In both cases, current is computed and changed twice as u(n) and u(n+0.5) in one sample.

First the multi-rate control of the single rate state estimation will be described. In multi-rate control, the current output value is output as u(n) and u(n+0.5) in one sample. Therefore basically Expression (26) is computed twice. In other words, the following Expression (28) and Expression (29) are executed.

$$\left.\begin{array}{l}Xh(n) = Xb(n) + L(y(n) - C \cdot Xb(n)) \\ Xh(n + Td/T) = Ad \cdot (Xh(n) - C^T \cdot r(n)) + Bd1 \cdot u(n - 0.5) + \\ Bd2 \cdot u(n - 1) \\ u(n) = -F \cdot Xh(n + Td/T) \\ Xb(n + 0.5) = A \cdot Xh(n) + B1 \cdot u(n) + B2 \cdot u(n - 0.5) + B3 \cdot u(n - 1)\end{array}\right\} \quad (28)$$

$$\left.\begin{array}{l}Xh(n + 0.5) = Xb(n + 0.5) \\ Xh(n + 0.5 + Td/T) = Ad \cdot (Xh(n + 0.5) - C^T \cdot r(n + 0.5)) + \\ Bd1 \cdot u(n) + Bd2 \cdot u(n - 0.5) \\ u(n + 0.5) = -F \cdot Xh(n + 0.5 + Td/T) \\ Xb(n + 1) = A \cdot Xh(n + 0.5) + B1 \cdot u(n + 0.5) + B2 \cdot u(n) + B3 \cdot u(n - 0.5)\end{array}\right\} \quad (29)$$

In other words, first Expression (28) is computed to compute the output u(n) and the next state Xb(n+0.5). Expression (28) is basically the same as Expression (26), but u(n−1) and u(n−0.5) are used for computing Xh(n+Td/T) and Xb(n+0.5) since current changes twice in one sample.

And as Expression (29) shows, the estimated state Xh(n+0.5) in the sample (n+0.5) is assumed as the estimated state Xb(n+0.5) in Expression (28), and the output u(n+0.5) and the next state Xb(n+1) are computed using the target trajectory r(n+0.5), just like the case of Expression (28).

Here the coefficients B1, B2 and B3 in Expression (28) and Expression (29) depend on the comparison of Td to which delay is added and T/2 (=n+0.5), and is determined by the following Expression (30) if Td<T/2.

In the case of 0<=Td<T/2

$$\begin{pmatrix}x(n+0.5) \\ v(n+0.5)\end{pmatrix} = \begin{pmatrix}1 & 1/2 \\ 0 & 1\end{pmatrix}\begin{pmatrix}x(n) \\ v(n)\end{pmatrix} + \quad (30)$$
$$\frac{Bl}{m}\frac{I_{MAX}}{Lp}\left\{\begin{pmatrix}(T-2Td)^2/8 \\ T(T-2Td)/2\end{pmatrix}u(n) + \begin{pmatrix}(T-Td)Td/2 \\ T \cdot Td\end{pmatrix}u(n-0.5)\right\}$$

If T/2<Td<T, on the other hand, the coefficients B1, B2 and B3 are determined by the following Expression (31).

In the case of T/2<Td<T $$\begin{pmatrix}x(n+0.5) \\ v(n+0.5)\end{pmatrix} = \begin{pmatrix}1 & 1/2 \\ 0 & 1\end{pmatrix}\begin{pmatrix}x(n) \\ v(n)\end{pmatrix} + \frac{Bl}{m}\frac{I_{MAX}}{Lp} \quad (31)$$
$$\left\{\begin{pmatrix}(T-2Td)^2/8 \\ T(T-2Td)/2\end{pmatrix}u(n-0.5) + \begin{pmatrix}(T-Td)Td/2 \\ T \cdot Td\end{pmatrix}u(n-1)\right\}$$

In other words, the coefficients of u(n) of Expressions (30) and (31) is B1 of Expressions (28) and (29), the coefficient of u(n−0.5) is B2, and the coefficient of u(n−1) is B3. Therefore if Td<T/2, then coefficient B3 is "0", and if T/2<Td, B1 is "0".

Now multi-rate control in the multi-rate state estimation will be described. In the multi-rate control as well, current output values u(n) and u(n+0.5) are output in one sample. Therefore in the multi-rate state estimation as well, Expression (24) is basically computed twice. In other words, the following Expressions (32) and (33) are executed.

$$\left.\begin{array}{l}e(n) = y(n) - C \cdot Xb(n) \\ Xh(n) = Xb(n) + L1 \cdot e(n) \\ Xh(n + Td/T) = Ad \cdot (Xh(n) - C^T \cdot r(n)) + Bd1 \cdot u(n - 0.5) + \\ Bd2 \cdot u(n - 1) \\ u(n) = -F \cdot Xh(n + Td/T) \\ Xb(n + 0.5) = A \cdot Xh(n) + B1 \cdot u(n) + B2 \cdot u(n - 0.5) + B3 \cdot u(n - 1)\end{array}\right\} \quad (32)$$

$$\left.\begin{array}{l}Xh(n + 0.5) = Xb(n + 0.5) + L2 \cdot e(n) \\ Xh(n + 0.5 + Td/T) = Ad \cdot (Xh(n + 0.5) - C^T \cdot r(n + 0.5)) + \\ Bd1 \cdot u(n) + Bd2 \cdot u(n - 0.5) \\ u(n + 0.5) = -F \cdot Xh(n + 0.5 + Td/T) \\ Xb(n + 1) = A \cdot Xh(n) + B1 \cdot u(n + 0.5) + B2 \cdot u(n) + B3 \cdot u(n - 0.5)\end{array}\right\} \quad (33)$$

First in order to compute the output u(n) and the next state Xb(n+0.5), Expression (32) is computed. This Expression (32) is basically the same as Expression (26), but current changes twice in one sample, so u(n−1) and u(n−0.5) are used for computing Xh(n+Td/T) and Xb(n+0.5). The estimated position error e(n) is separately computed by (y(n)−C·Xb(n)).

And as Expression (33) shows, the estimated state Xh(n+0.5) in the sample (n+0.5) is corrected to the estimated state Xb(n+0.5) in Expression (32) by a value resulting when e(n) in Expression (32) is multiplied by L2. Also using the target trajectory r(n+0.5), the output u(n+0.5) and the next state Xb(n+1) are computed, just like Expression (33).

Here the coefficients B1, B2 and B3 in Expression (32) and Expression (33) depend on the comparison of Td to which delay is added and T/2(=n+0.5), and is determined by Expression (30) if Td<T/2, and by Expression (31) if 2/T<Td.

The difference from the single rate state estimation in Expression (28) and Expression (29) is that the estimated state Xh(n+0.5) in the sample (n+0.5) is corrected to the estimated state Xb(n+0.5) in Expression (32), using a value resulting when e(n) in Expression (32) is multiplied by L2, as shown in Expression (33). In this way, multi-rate state estimation corrects the second estimated state with the position error observed at sample time, just like the first time.

In Xh(n+Td/T) and Xh(n+0.5+Td/T) in Expression (32) and Expression (33) are substituted for other expressions in Expression (32) and Expression (33), then Expression (32) and Expression (33) can be transformed to the following Expression (34).

$$\left.\begin{array}{l}e(n) = y(n) - C \cdot Xb(n) \\ Xh(n) = Xb(n) + L1 \cdot e(n) \\ u(n) = -F \cdot Ad \cdot (Xh(n) - C^T \cdot r(n)) - F \cdot Bd1 \cdot u(n - 0.5) - \\ F \cdot Bd2 \cdot u(n - 1) \\ Xb(n + 0.5) = A \cdot Xh(n) + B1 \cdot u(n) + B2 \cdot u(n - 0.5) + B3 \cdot u(n - 1) \\ Xb(n + 0.5) = Xb((n + 0.5) + L2 \cdot e(n) \\ u(n + 0.5) = -F \cdot Ad \cdot (Xh(n + 0.5) - C^T \cdot r(n + 0.5)) - F \cdot \\ Bd1 \cdot u(n) - F \cdot Bd2 \cdot u(n - 0.5) \\ Xb(n + 1) = A \cdot Xh(n) + B1 \cdot u(n + 0.5) + B2 \cdot u(n) + B3 \cdot u(n - 0.5)\end{array}\right\} \quad (34)$$

In Expression (34), Xh(n+Td/T) of Expression (32) is integrated into the calculation of u(n) of Expression (32), and Xh(n+0.5+Td/T) of Expression (33) is integrated into the calculation of u(n+0.5) of Expression (33). As the number of expressions decreases, the calculation time naturally decreases, and response becomes faster.

When L2 in Expression (34) is "0", this indicates the single rate state estimation expression described in Expression (28) and Expression (29), and when L2 is not "0", this indicates a multi-rate state estimation expression.

FIG. 20 is a block diagram blocking Expression (34). The configuration in FIG. 20 is basically two configurations in FIG. 19 connected in series. As FIG. 30 shows, the observation position (position error) y(n) in current sample n is loaded, and the difference between the predicted position C·Xb(n) in the current sample estimated in the previous sample and the observation position y(n) is computed in the computing block 52-1, so as to generate an estimated position error er[n]. In the multiplication block 54-1, this estimated position error er[n] is multiplied by the estimated gain L1 to generate a correction value.

In the addition block 56-1, this correction value and the estimated state Xb[n], such as predicted position and predicted velocity, in the current sample, are added. By this, the estimated state Xh(n), such as the estimated position and estimated velocity, in the current sample in Expression (34), is generated.

And in the two degree of freedom control, the difference value between the estimated state (position) Xh(n) and the target position trajectory r(n) is computed in the addition block 58-1, and the result is multiplied by the coefficient matrix −F·Ad in the multiplication block 76-1. On the other hand, the output u(n−1) is multiplied by the coefficient matrix −F·Bd2 in the multiplication block 78-2, and the output u(n−0.5) is multiplied by the coefficient matrix −F·Bd1 in the multiplication block 78-1. The outputs of the three multiplication blocks 76-1, 78-1 and 78-2 are added in the addition block 80-1, and the output value u(n) of the third expression of Expression (34) is acquired.

On the other hand, the estimated state Xb(n+0.5) in the next sample (n+0.5) is calculated as the fourth expression of Expression (34) by adding a value resulting when the estimated state Xh(n) in the current sample is multiplied by the coefficient matrix A in the multiplication block 62-1, a value resulting when the output value u(n) is multiplied by the coefficient matrix B1 in the multiplication block 64-1, a value resulting when the output value u(n−0.5) is multiplied by the coefficient matrix B2 in the multiplication block 64-3, and a value resulting when the output value u(n−1) in the previous sample delayed in the delay block 82-1 is multiplied by the coefficient matrix B3 in the multiplication block 64-2, in the addition block 66-1.

Then the estimated position error er[n] computed in the computing block 52 is multiplied by the estimated gain L2 in the multiplication block 54-2, so as to generate a correction value. And in the addition block 56-2, this correction value and the estimated state Xb(n+0.5), such as a predicted position and predicted velocity, in the current sample, are added. By this, the estimated state Xh(n+0.5), such as an estimated position and estimated velocity, in the current sample of Expression (34), is generated.

And in multi-rate control, the difference value between the estimated state (position) Xh(n+0.5) and the target position trajectory r(n+0.5) is computed in the addition block 58-2, and the result is multiplied by the coefficient matrix −F·Ad in the multiplication block 76-2.

On the other hand, the output u(n−0.5) is multiplied by the coefficient matrix −F·Bd2 in the multiplication block 78-4, and the output u(n) is multiplied by the coefficient matrix −F·Bd1 in the multiplication block 78-3. The outputs of the three multiplication blocks 76-2, 78-3 and 78-4 are added in the addition block 80-2, and the output value u(n+0.5) of the sixth expression of Expression (34) is acquired.

On the other hand, the estimated state Xb(n+1) in the next sample (n+1) is calculated as the seventh expression of Expression (34), by adding a value resulting when the estimated state Xh(n+0.5) in the current sample is multiplied by the coefficient matrix A in the multiplication block 62-2, a value resulting when the output value u(n+0.5) is multiplied by the coefficient matrix B1 in the multiplication block 64-4, a value resulting when the output value u(n) is multiplied by the coefficient matrix B2 in the multiplication block 64-6, and a value resulting when the output value u(n−0.5) in the previous sample delayed in the delay block 82-2 is multiplied by the coefficient matrix B3 in the multiplication block 64-5, in the addition block 66-2.

In the delay block 68, the estimated state Xb(n+1) in the next sample (n+1) is delayed, and in the multiplication block 50-1, the output of the delay block 68 is multiplied by C so as to calculate the estimated position x(n) in the current sample.

In this way, the two degree of freedom control terms are calculated at a same sample time, so the calculation sequence becoming complicated can be prevented in this multi-rate control, and calculation can be performed at high-speed. Also the state estimation sequence can be adhered to, and stability of the entire system can be maintained.

In the blocks in FIG. 20, if L2 in the multiplication block 54-2 is set to "0", it becomes the configuration of single rate state estimation, so the configuration of FIG. 20 can be used for both single rate and multi-rate state estimation.

In this case, the target trajectory generation section 44 described in FIG. 5 generates the target trajectory r in every 0.5 sample time. In other words, r(n) and r(n+0.5) are generated. In the same way, the above mentioned current step difference cancellation trajectory generation section 28 also generates the current step difference cancellation trajectory r' in every 0.5 sample time. In other words, r'(n) and r'(n+0.5) are generated.

Other Embodiments

In the above embodiments, the position control was described using an example of a head positioning device of a magnetic disk device, but the present invention can be applied to other disk devices, such as an optical disk device. The disturbance model was considered, but the present invention can also be applied to cases when the disturbance model is not considered.

The present invention was described using the embodiments, but the present invention can be modified in various ways within the scope of the essential character thereof, and these variant forms shall not be excluded from the scope of the present invention.

When seek control is switched to following control, a current value Udiff for the amount of the step difference is calculated based on the difference between the current values u(n) and u(n−1), and a target position trajectory (or target current trajectory) for offsetting this calculation value is supplied to the following control, so the current step difference of the output current is cancelled. In the following control, which is constructed by a two degree of freedom control system, a target position trajectory is provided as a target position in the two degree of freedom position control system, therefore unnecessary disturbance is not input, and the control system is not affected. Also by using the current step difference cancellation configuration, switching conditions can be more relaxed, and switching to the following control at a more distant position from the target position and at faster velocity is possible than prior art. As a consequence, seek time can be further decreased.

What is claimed is:

1. A seek control method for performing seek control of an object to a target position using an actuator, comprising:
    a step of computing a position error based on a target position of the object and a current position of the object;
    a step of executing seek control according to the position error; and
    a step of switching to a following control when reaching near the target position is detected and executing the following control,
    wherein the step of executing the following control further comprises:
    a step of generating a target trajectory according to a difference between a control current of the seek control before the switching and a control current of the following control after the switching; and
    a step of executing the following control based on a two degree of freedom current observer control according to the target trajectory and the position error.

2. The seek control method according to claim 1, wherein the step of generating the target trajectory comprises:
    a step of computing the control current of the following control after the switching based on the two degree of freedom current observer control; and
    a step of generating a target trajectory according to the difference between the control current of the seek control before the switching and the computed control current of the following control.

3. The seek control method according to claim 1, wherein the step of executing the seek control comprises a step of computing the control current according to a position trajectory up to the target position based on the two degree of freedom current observer control.

4. The seek control method according to claim 1, wherein the step of executing the following control based on the two degree of freedom current observer control comprises:
    a step of correcting an estimated position of a current sample of the current observer based on an estimated position error from the estimated position of the current sample;
    a step of computing a difference between the corrected estimated position and the target trajectory of the current sample;
    a step of computing an output value of the actuator based on the difference; and
    a step of computing an estimated position for computing a next output value based on the corrected estimated position and the output value of the current sample.

5. The seek control method according to claim 1, wherein the step of generating the target trajectory comprises a step of computing a difference between the control current of the seek control before the switching and the control current of the following control after the switching.

6. The seek control method according to claim 1, wherein the step of generating the target trajectory comprises:
    a step of computing a difference between the control current of the seek control before the switching and the control current of the following control after the switching; and
    a step of generating a target position trajectory according to the difference.

7. A medium storage device, comprising:
    a head for at least reading data of a storage medium;
    an actuator for positioning the head to a predetermined position of the storage medium; and
    a control unit for executing seek control according to a position error based on a target position of the head and a current position acquired from the head, switching to a following control when reaching near the target position is detected, and executing the following control,
    wherein the control unit generates a target trajectory according to a difference between a control current of the seek control before the switching and a control current of the following control after the switching, and executes the following control based on a two degree of freedom current observer control according to the target trajectory and the position error.

8. The medium storage device according to claim 7, wherein the control unit computes the control current of the following control after the switching based on the two degree of freedom current observer control, and generates a target trajectory according to the difference between the control current of the seek control before the switching and the computed control current of the following control.

9. The medium storage device according to claim 7, wherein the control unit computes control current according to a position trajectory up to the target position based on the two degree of freedom current observer control and performs seek control.

10. The medium storage device according to claim 7, wherein the control unit corrects an estimated position of a current sample of the current observer based on an estimated position error from the estimated position of the current sample, computes a difference between the corrected estimated position and the target trajectory of the current sample, computes an output value of the actuator based on the difference, and computes an estimated position for computing a next output value based on the corrected estimated position and the output value of the current sample.

11. The medium storage device according to claim 10, wherein the control unit computes an estimated position advanced by a predetermined time from the sample point of time based on an output value in one sample before and the difference, computes an output value to the actuator based on the advanced estimated position, and computes an estimated position for computing a next output value based on the corrected estimated position, the output value of the current sample, and the output value in one sample before.

12. The medium storage device according to claim 7, wherein the control unit computes a difference between the control current of the seek control before the switching and the control current of the following control after the switching.

13. The medium storage device according to claim 7, wherein the control unit computes a difference between the control current of the seek control before the switching and the control current of the following control after the switching, and generates a target position trajectory according to the difference.

14. A seek control device for performing a seek control of an object to a target position using an actuator, comprising:
    a block for computing a position error based on a target position of the object and a current position of the object; and
    a control unit for executing seek control according to the position error, switching to a following control when reaching near the target position is detected, and executing the following control,
    wherein the control unit generates a target trajectory according to a difference between a control current of the seek control before the switching and a control current of the following control after the switching, and executes the following control based on a two degree of freedom current observer control according to the target trajectory and the position error.

15. The seek control device according to claim 14, wherein the control unit computes the control current of the following control after the switching based on the two degree of freedom current observer control, and generates a target trajectory according to the difference between the control current of the seek control before the switching and the computed control current of the following control.

16. The seek control device according to claim 14, wherein the control unit computes the control current according to a position trajectory up to the target position based on the two degree of freedom current observer control, and performs seek control.

17. The seek control device according to claim 14, wherein the control unit corrects an estimated position of a current sample of the current observer based on an estimated position error from the estimated position of the current sample, computes a difference between the corrected estimated position and the target trajectory of the current sample, computes an output value of the actuator based on the difference, and computes an estimated position for computing a next output value based on the corrected estimated position, and the output value of the current sample.

18. The seek control device according to claim 17, wherein the control unit computes an estimated position advanced by a predetermined time from the sample point of time based on an output value in one sample before and the difference, computes an output value to the actuator based on the advanced estimated position, and computes an estimated position for computing a next output value based on the corrected estimated position, the output value of the current sample, and the output value in one sample before.

19. The seek control device according to claim 14, wherein the control unit computes a difference between the control current of the seek control before the switching and the control current of the following control after the switching.

20. The seek control device according to claim 14, wherein the control unit computes a difference between the control current of the seek control before the switching and the control current of the following control after the switching, and generates a target position trajectory according to the difference.

\* \* \* \* \*